US011736898B2

(12) United States Patent
Singh et al.

(10) Patent No.: US 11,736,898 B2
(45) Date of Patent: Aug. 22, 2023

(54) RADIO FREQUENCY (RF) SENSING AND MOTION DETECTION USING A SINGLE CHAIN

(71) Applicant: QUALCOMM Incorporated, San Diego, CA (US)

(72) Inventors: Devesh Singh, Bangalore (IN); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/403,517

(22) Filed: Aug. 16, 2021

(65) Prior Publication Data

US 2023/0050103 A1    Feb. 16, 2023

(51) Int. Cl.
  *H04W 4/02*    (2018.01)
(52) U.S. Cl.
  CPC ................... *H04W 4/027* (2013.01)
(58) Field of Classification Search
  CPC ....................................................... H04W 4/80
  See application file for complete search history.

(56) References Cited

U.S. PATENT DOCUMENTS

| | | | |
|---|---|---|---|
| 9,755,883 B1* | 9/2017 | Roy | H04B 7/0617 |
| 11,070,399 B1 | 7/2021 | Omer et al. | |
| 2011/0170622 A1* | 7/2011 | Nakayama | H04B 7/0626 |
| | | | 375/260 |
| 2015/0212205 A1* | 7/2015 | Shpater | G01S 13/56 |
| | | | 342/28 |
| 2017/0124592 A1* | 5/2017 | Naya | H04W 4/18 |
| 2017/0264411 A1* | 9/2017 | Wang | H04L 27/26 |
| 2018/0262866 A1* | 9/2018 | Haverinen | H04B 17/20 |
| 2019/0208456 A1* | 7/2019 | Mofidi | H04W 40/02 |
| 2019/0379434 A1* | 12/2019 | Lindskog | G01P 13/04 |
| 2020/0400778 A1 | 12/2020 | Da Silva et al. | |
| 2021/0359774 A1* | 11/2021 | Tertinek | G01S 7/415 |
| 2022/0128645 A1* | 4/2022 | Cvetkovic | G01S 5/0269 |
| 2022/0287629 A1* | 9/2022 | Forsyth | G06F 3/14 |

OTHER PUBLICATIONS

International Search Report and Written Opinion—PCT/US2022/073264—ISA/EPO—dated Oct. 11, 2022.

* cited by examiner

*Primary Examiner* — Ernest G Tacsik
(74) *Attorney, Agent, or Firm* — Muncy, Geissler, Olds & Lowe, P.C./Qualcomm

(57) ABSTRACT

In an aspect, a wireless device receives one or more sensing sets. Each sensing set has one or more sensing packets. The wireless device determines one or more motion detection metrics. Each motion detection metric is based on phase differences between tones of the one or more sensing packets for each of the one or more sensing sets. The wireless device determines one or more detected motion magnitudes based on a comparison of each motion detection metric for each of the one or more sensing sets and a baseline metric. The wireless device detects a motion based on at least a portion of the one or more detected motion magnitudes exceeding a first motion threshold.

41 Claims, 11 Drawing Sheets

RADIO FREQUENCY (RF) SENSING AND MOTION DETECTION USING A SINGLE CHAIN

BACKGROUND OF THE DISCLOSURE

Field of the Disclosure

Aspects of this disclosure relate generally to radio frequency (RF) sensing, and in some aspects, to detecting motion using RF sensing.

Description of the Related Art

RF sensing uses Wi-Fi signals, e.g., signals that comply with the Institute of Electrical and Electronics Engineers (IEEE) 802.11 standards, to perform motion detection and tracking related functions (e.g., physical security, monitoring a person to detect falling, monitoring a sleeping person, and the like). Some applications for RF sensing, such as the internet of things (IOT), may use low-cost solutions in which an IOT device has a single radio frequency (RF) chain. Phased-based motion detection use multiple antennas. For this reason, single RF chain devices use amplitude-based motion detection. However, amplitude-based motion detection may be relatively inaccurate compared to phase-based motion detection, as phase is more sensitive to motion than amplitude.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method includes receiving one or more sensing sets. Each sensing set has one or more sensing packets. The method includes determining one or more motion detection metrics. Each motion detection metric is based on phase differences between tones of the one or more sensing packets for each of the one or more sensing sets. The method includes determining one or more detected motion magnitudes based on a comparison of each motion detection metric for each of the one or more sensing sets and a baseline metric. The method includes detecting a motion based on at least a portion of the one or more detected motion magnitudes exceeding a first motion threshold.

In an aspect, a wireless device includes a memory, a communication interface, and at least one processor communicatively coupled to the memory and the communication interface. The at least one processor is configured to receive one or more sensing sets. Each sensing set has one or more sensing packets. The at least one processor is configured to determine one or more motion detection metrics. Each motion detection metric is based on phase differences between tones of the one or more sensing packets for each of the one or more sensing sets. The at least one processor is configured to determine one or more detected motion magnitudes based on a comparison of each motion detection metric for each of the one or more sensing sets and a baseline metric. The at least one processor is configured to detect motion based on at least a portion of the one or more detected motion magnitudes exceeding a first motion threshold.

In an aspect, an apparatus includes means for receiving one or more sensing sets. Each sensing set has one or more sensing packets. The apparatus includes means for determining one or more motion detection metrics. Each motion detection metric is based on phase differences between tones of the one or more sensing packets for each of the one or more sensing sets. The apparatus includes means for determining one or more detected motion magnitudes based on a comparison of each motion detection metric for each of the one or more sensing sets and a baseline metric. The apparatus includes means for detecting a motion based on at least a portion of the one or more detected motion magnitudes exceeding a first motion threshold.

In an aspect, a non-transitory computer-readable medium stores computer-executable instructions that, when executed by a user equipment, cause the user equipment to receive one or more sensing sets. Each sensing set has one or more sensing packets. The instructions are further executable to determine one or more motion detection metrics. Each motion detection metric is based on phase differences between tones of the one or more sensing packets for each of the one or more sensing sets. The instructions are further executable to determine one or more detected motion magnitudes based on a comparison of each motion detection metric for each of the one or more sensing sets and a baseline metric. The instructions are further executable to detect motion based on at least a portion of the one or more detected motion magnitudes exceeding a first motion threshold.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof. A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
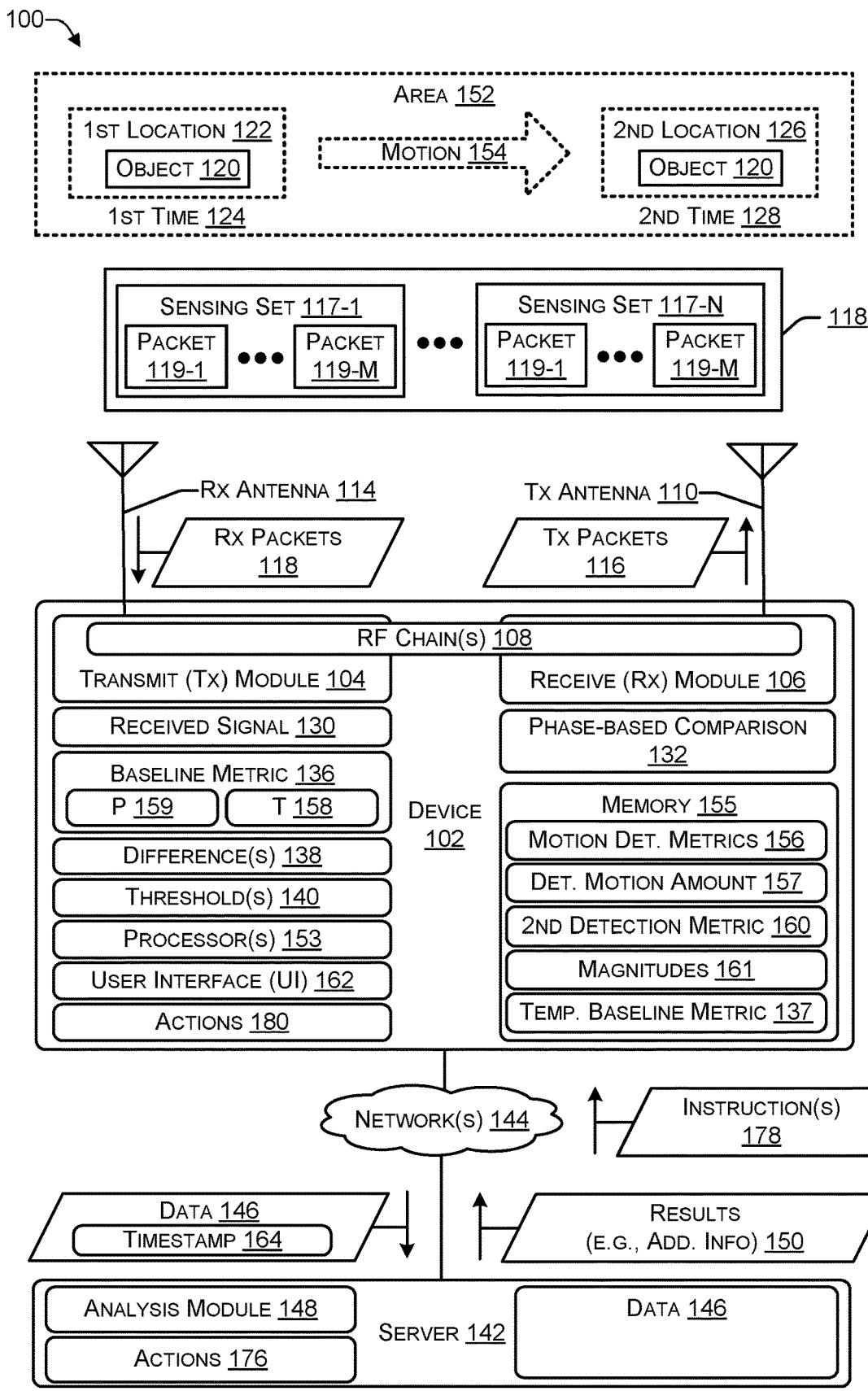
FIG. 1 illustrates an example motion sensing system, according to various aspects of the disclosure.

Disclosed are systems and techniques for accurate motion detection using a single radio frequency (RF) chain of a device. An RF chain refers to a radio along with the associated components, such as, for example, mixers, amplifiers, and analog-to-digital converters (ADC). RF sensing (e.g., motion detection) typically uses phase-based detection with multiple RF chains because such systems provide a high degree of accuracy. However, using devices with multiple chains is relatively expensive and may not be suited for low-cost applications, such as internet of things (IOT), where RF sensing is performed by devices located on the edge of the network ("edge devices"). For example, in an application such as a home or business security system, gaming, or the like, edge devices may be used to detect motion substantially in real-time.

Amplitude-based motion detection is not as accurate as phase-based motion detection because phase is more sensitive to motion than amplitude. Single chain, phase-based motion sensing is subject to interference caused by sampling frequency offset (SFO), carrier frequency offset (CFO), timing synchronization errors (TSE), or any combination thereof. Multiple chain devices may identify and remove interference (e.g., caused by SFO, CFO, and TSE) by determining a phase difference between chains to identify the interference and then removing the interference. CFO is caused by the difference between a transmitter and a receiver's Local Oscillator that results in a phase rotation of incoming In-phase and Quadrature (I/Q) samples (e.g., in the time domain). SFO is an effect of sampling that results in a phase rotation of constellation points after Fast Fourier Transform (FFT) (e.g., in the frequency domain).

The systems and techniques described herein may provide accurate motion sensing (e.g., motion detection) using a relatively low cost, single chain-based solution. For example, the systems and techniques can be deployed for use with IOT, edge devices, and the like. With a single chain device, a phase difference between tones is used to identify and remove interference caused by SFO, CFO, and TSE. For example, the tones may be consecutive tones, every Nth tone (N>0), tones having an amplitude greater than a threshold, tones selected based on another selection criteria, or any combination thereof. A single RF chain may receive multiple versions of the same signal, a first reflection of the signal, a second reflection of the signal, and the like. The systems and techniques determine a difference between tones (e.g., sub-carriers). If the difference is relatively small (e.g., less than a threshold), then the systems and techniques may determine that motion is absent. If the difference is relatively large (e.g., greater than or equal to a threshold), then the systems and techniques may determine that motion is present.

The systems and techniques may determine a baseline (BL) when motion is absent in an area that is being monitored. The baseline may determine phase characteristics when there is no motion in the area for a particular period of time (e.g., between 2 seconds to 1 minute). The amount of time used to determine the BL may depend on the size of the area, the desired accuracy, how long motion can be stopped in the area, and other factors. The BL may be determined periodically (e.g., every day at 3:00 AM), in response to a user request, based on another factor (e.g., after motion has been detected for greater than a threshold amount of time), or the like. After the BL is determined, the BL may be saved. In motion detection mode, a phase metric between tones may be determined substantially in real time (e.g., less than 500 milliseconds (ms)) and compared with the BL in real time to determine the presence or absence of motion in the area that is being monitored for motion. Prior to determining the BL, the single RF chain device may perform a countdown (visually, audibly, or both) to enable a user to remove objects capable of motion (e.g., the user, a pet, a child, or the like) from the area being monitored. The BL may include phase characteristics of the RF signal when motion is absent from the monitored area and may be saved in a memory location accessible to the monitoring device.

When an area is being monitored for motion, the phase difference between tones may be determined and summed for comparison with the BL. While the following example illustrates using the phase difference between adjacent tones to detect motion, it should be understood that non-adjacent tones may also be used to detect motion. At 20 megahertz (MHz), the Institute of Electrical and Electronics Engineers (IEEE) 802.11 standard specifies 52 tones. In this example, the device performing the RF sensing may determine 51 phase differences between the 52 adjacent tones. When motion is absent from the monitored area, the signal correlation between adjacent tones is relatively small, resulting in relatively small phase differences between adjacent tones. When motion is present in the monitored area, there is less signal correlation between adjacent tones, resulting in relatively large phase differences between adjacent tones. The amount of motion present in the monitored area may be determined by calculating a mean squared error (MSE) of the phase differences between adjacent tones. The MSE measures an average squared difference (e.g., deviation) between the phase of adjacent tones.

One or more thresholds may be used to classify the amount of motion identified in the monitored area. For example, an MSE value less than a first threshold may be classified as no motion. An MSE value greater than the first threshold but less than a second threshold may be classified as light motion or may be processed further (e.g., using a machine learning algorithm executing on a server) to determine whether to classify the motion as no motion, light motion, or significant motion. An MSE value greater than or equal to the second threshold may be classified as significant motion. It will be appreciated that the various aspects disclosed may include more intermediary thresholds between the light motion (first) threshold and the significant motion (second) threshold, so the terms "first" and "second" do not infer that there may be only two thresholds in all aspects. Of course, in some cases, a single threshold (e.g., the second threshold) may be used to determine whether motion is absent (e.g., MSE<threshold) or motion is present (MSE>=threshold).

In this way, a low cost, single RF chain device (e.g., IOT device, edge device, or the like) may determine the MSE of phase differences between tones (e.g., carriers) to determine the presence or absence of motion in an area. Applications may include physical security, monitoring children, monitoring adults, monitoring pets, gaming, and the like. By using the phase difference, the motion detection accuracy may be significantly improved compared to using an amplitude difference, providing a low cost and accurate motion sensing solution for single RF chain devices.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "example" and/or "exemplary" are used herein to mean "serving as an example, instance, or illustration." Any aspect described herein as "example" and/or "exemplary" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send RF signals to a base station is called an uplink (UL) channel (e.g., a reverse traffic channel, a reverse control channel, an access channel, etc.). A communication link through which the base station can send RF signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal," a "radio wave," a "waveform," or the like, or simply a "signal" where it is clear from the context that the term "signal" refers to a wireless signal or an RF signal.

FIG. 1 illustrates an example motion sensing system 100, according to various aspects of the disclosure. In the system 100, a device 102 may include a transmit (Tx) module 104 and a receive (Rx) module 106. The transmit module 104 and the receive module 106 may use at least one Radio Frequency (RF) chain 108. The RF chain 108 may include, for example, a low noise amplifier (LNA), one or more bandpass filters (BPF), an intermediate frequency (IF) amplifier, a digital to analog converter (DAC), an analog to digital converter (ADC), or any combination thereof. The device 102 may include one or more processors 153 that are capable of executing instructions and data stored in a memory 155. The transmit module 104 may transmit one or more Tx packets 116 using the Tx antenna 110. The receive module 106 may receive one or more Rx packets 118 using the Rx antenna 114. In aspects where the device 102 includes a single RF chain 108, the device 102 may be referred to as a "single chain device". However, it should be understood that, in some aspects, the device 102 may include multiple RF chains. When the device 102 includes multiple chains, one chain is used for RF Sensing while the other RF chains are used to provide data communication services. For example, a first RF chain may be used for RF sensing and motion detection on a first channel while a second RF chain may be used to simultaneously provide data communication services on a second channel. In addition, technologies such as Single Band Simultaneous (SBS) Dual Band Simultaneous (DBS), Multi-Link Operation (MLO)), and the like support using two chains to operate on two different channels simultaneously. In some aspects, a first device may transmit packets while a second device receives the packets and performs motion sensing. In some aspects, monostatic sensing may be used, in which a two-chain device uses a first chain to transmit packets and a second chain to receive the packets and perform RF sensing.

The Rx packets 118 may include N groups of packets (N>0), such as a sensing set 117-1 to a sensing set 117-N. Each sensing set 117 may include M packets (M>0). For example, each of the sensing sets 117 may include a packet 119-1 to a packet 119-M.

The device 102 may monitor an area 152 to determine if motion is present in the area 152. For example, an object 120 located at a first location 122 at a first time 124 may experience motion 154 such that the object 120 is located at a second location 126 at a second time 128, where the first location 122 is different from the second location 126, and where the second time 128 is subsequent to the first time 124. The device 102 may monitor the area 152 by transmitting Tx packets 116 and receiving Rx packets 118.

During a time period between the first time 124 and the second time 128, the device 102 may transmit the Tx packets 116 and receive the Rx packets 118. The receive module 106 may convert the Rx packets 118 into a received signal 130. In some aspects, the device 102 may use a phase-based comparison 132 to determine a difference in phase of tones (e.g., carriers) of the received signal 130 with a baseline metric 136 to determine a difference 138. In other aspects, the device 102 may use the phase-based comparison 132 to compare a difference in phase of the Tx packets 116 at a first time 124 with a phase of the Tx packets 116 at second time 128 to determine the difference 138 (e.g., a phase difference between a first set of packets and a second set of packets sent subsequent to the first set of packets). If the difference 138 satisfies a first threshold of the thresholds 140, then the motion 154 may be classified as light motion. If the difference 138 satisfies a second threshold of the thresholds 140, then the motion 154 may be classified as significant motion. If the difference 138 fails to satisfy any of the thresholds 140, then the device 102 may determine that no motion is present in the area 152. If a single one of the thresholds 140 is used, then if the phase difference 138 between the received signal 130 and the baseline metric 136 fails to satisfy the threshold 140 then the device 102 may determine that motion is absent from the area 152. If the phase difference 138 between the received signal 130 and the baseline metric 136 satisfies the threshold 140, then the device 102 may determine that the motion 154 is present in the area 152.

The device 102 may determine the baseline metric 136 when motion is absent in the area 152 that is being monitored for motion. The baseline metric 136 may include phase characteristics associated with the Rx packets 118 received when there is no motion in the area 152 for a particular period of time (e.g., between 2 seconds to 1 minute). The amount of time used to determine the baseline metric 136 may depend on the size of the area 152, the desired accuracy, how long motion can be stopped in the area 152, and other factors. The baseline metric 136 may be determined periodically (e.g., every day at 3:00 AM), in response to a user request, after motion has been detected in at least a threshold time interval, or any combination thereof. For example, if the device 102 determines that the motion 154 is occurring for at least a threshold amount of time (e.g., the difference between the second time 128 and the first time 124 is greater than or equal to the threshold), then the device 102 may automatically determine the baseline metric 136 when the motion 154 is absent from the area 152.

After the device 102 determines the baseline metric 136, the device 102 may save the baseline metric 136 for use in detecting the motion 154 in the area 152. In motion detection mode, a phase metric between tones of the Rx packets 118 may be determined substantially in real time (e.g., less than 500 milliseconds (ms)) and compared with the baseline metric 136 in real time to determine the presence or absence of the motion 154 in the area 152 that is being monitored.

Prior to determining the baseline metric 136, the device 102 may perform a countdown (visually, audibly, or both) to enable a user to remove objects capable of motion (e.g., the user, a pet, a child, or the like) from the area 152 being monitored. The baseline metric 136 may include phase characteristics, such as phase differences between multiple tones, of the RF signal (e.g., Wi-Fi signal) when the motion 154 is absent from the monitored area 152 and may be saved in a memory location accessible to the device 102. To determine the baseline metric 136, a number of packets (P) 159 may be transmitted, with each packet sent at a time interval (T) 158 milliseconds apart. Both P 159 and T 158 are programmable. For example, P 159 and T 158 may be set to default values during manufacturing and may be modified by a user. The Tx packets 116 may be each transmitted at a programmable time interval, such as between about 1 millisecond (ms) to about 100 ms. For example, for T=10 ms interval, a first of the Tx packets 116 may be sent, after 10 ms a second of the Tx packets 116 may be sent, after 10 ms a third of the Tx packets 116, and so on until all packets have been sent (e.g., transmitted). The number of packets P 159 to be transmitted may vary depending on the desired accuracy, the size of the area 152, an amount of time objects that move can be excluded from the area 152, and the like. For example, P=1200 and T=50 ms takes 1 minute to determine the baseline metric 136. As another example, P=100 and T=100 ms takes 10 seconds to determine the baseline metric 136. As a further example, P=200 and T=10 ms takes 2 seconds to determine the baseline metric 136. Thus, P may vary between about 100 to about 1500 packets.

The device 102 may be connected to a server 142 via one or more networks 144. If the difference 138 between the received signal 130 and the baseline metric 136 satisfies a first of the thresholds 140 but fails to satisfy a second of the thresholds 140, in some cases, the device 102 may send data 146 to the server 142 for further analysis. For example, the data 146 may include the received signal 130, the baseline metric 136, the differences 138, the thresholds 140, additional data, or any combination thereof. The server 142 may use an analysis module 148 to analyze the data 146. For example, the analysis module 148 may use machine learning, such as a classifier (e.g., a support vector machine (SVM) or another type of classifier), to classify the data 146 as predicting no motion, a small amount of motion, or significant motion. The server 142 may send results 150 of the analysis module 148 to the device 102. For example, if the phase-based comparison 132 indicates that the difference 138 satisfies a first of the thresholds 140 but fails to satisfy a second of the thresholds 140, then the device 102 may send the data 146 to the server 142 for further analysis. The server 142 may use the analysis module 148 to determine, based on the data 146, whether the data indicates that the motion 154 is present or the motion 154 is absent and send the results 150 to the device 102 and may optionally send instructions 178 to perform additional actions 176 determined by the server 142.

If the device 102 detects the motion 154 in the area 152 being monitored, then the device 102 may perform one or more actions 180, such as sending a message to a device (e.g., a user device, an alarm monitoring company's device, or the like) indicating that the motion 154 has been detected, initiating sounding an audible alarm, or performing another action. For example, an owner of a pet may get a notification on a device indicating that the pet has generated motion 154 in the area 152. As another example, a medical professional may receive a notification that a patient has generated motion 154 in the area 152. As yet another example, a parent may receive a notification that a child has generated motion 154 in the area 152.

To reduce false positives, the phase-based comparison 132 may, in some cases, determine a phase difference between individual packets and the baseline metric 136. The phase-based comparison 132 may determine that the motion 154 is present after determining that a particular percentage (e.g., 80%, 90%, 95%, or the like) of packets differ from the baseline metric 136 by more than a predetermined one of the thresholds 140.

Thus, a wireless device, such as the device 102, detects the motion 154 (e.g., movement) in the area 152. For example, the wireless device 102 receives one or more sensing sets 117-1 to 117-N. Each sensing set 117 has one or more sensing packets 119-1 to 119-M. The device 102 determines one or more motion detection metrics 156. Each of the motion detection metrics 156 is based on phase differences between tones of the packets 118 (e.g., sensing packets) for each of the one or more sensing sets 117. The device 102 determines one or more detected motion magnitudes 161 based on a comparison of each of the motion detection metrics 156 for each of the one or more sensing sets 117 and the baseline metric 136. Detecting the motion 154 may be based on at least a portion of the one or more detected motion magnitudes 161 exceeding a first motion threshold of the thresholds 140. The one or more sensing sets 117 include the first sensing set 117-1. The first sensing set 117-1 includes one or more first sensing packets 119. Determining the one or more motion detection metrics may include determining a first motion detection metric based on phase differences 138 between tones of the one or more first sensing packets 119. Determining the one or more detected motion magnitudes 161 may include determining a first detected motion magnitude (of the magnitudes 161) based on a comparison of the first motion detection metric (of the motion detection metrics 156) and the baseline metric 136. The device 102 may detect the motion 154 based on the first detected motion magnitude (of the magnitudes 161) exceeding a first motion threshold (of the thresholds 140).

The baseline metric 136 is based on the phase differences between tones from one or more previously received packets (of the Rx packets 118) received by a first receiver chain of the RF chains 108. In some cases, the one or more previously received packets are received immediately prior to the one or more of the sensing packets. For example, the packets in the sensing set 117-1 may be received immediately prior to the packets in the sensing set 117-N (e.g., N=2). In some cases, the one or more previously received packets may be packets received when no motion is present (e.g., the motion 154 is absent). In some cases, the device 102 may receive confirmation, via a user interface 162 of the device 102, to establish no motion is present. In some cases, the device 102 mat periodically trigger an acquisition of the one or more previously received packets. For example, the one or more previously received packets may be received based on a predetermined time of day (e.g., 2:00 AM). The device 102 may update the baseline metric 136 with phase differences between tones from the one or more sensing packets, when the motion 154 is not detected.

The device 102 may establish a temporary baseline metric 137 based on phase differences between tones from the one or more sensing packets 119 when the motion 154 is detected. The device 102 may receive one or more subsequent sensing packets 119 on a first receiver chain 108, determine a subsequent motion detection metric 156 based on phase differences between tones of the one or more subsequent sensing packets 119, determine a subsequent motion magnitude (of the magnitudes 161) based on a comparison of the subsequent motion detection metric 156 and the temporary baseline metric 137, and detect a change in environment based on the subsequent motion magnitude (of the magnitudes 161) not exceeding the first motion threshold (of the thresholds 140). The device 102 may update the baseline metric 136 to the temporary baseline metric 137 when the change in environment is detected.

In some cases, the device 102 may send data 146 and a timestamp 164 associated with the data 146 to a server 142 for further analysis. For example, the data 146 may include at least one of: channel state information (CSI), channel frequency response (CFR), channel impulse response (CIR), a signal strength indicator, an automatic gain control (AGC) setting, or any combination thereof. The device 102 may receive, from the server 142, results 150 that includes additional information regarding the motion 154 detected. For example, the additional information in the results 150 may include at least one of: confirmation of the motion 154 being detected, identification of a source of the motion 154, or classification (e.g., no motion, light motion, or significant motion), of the motion 154.

The device 102 may transmit the packets 116 (e.g., sensing packets) before receiving the packets 118. For example, the device 102 may transmit the packets 116 (e.g., sensing packets) using a first transmit chain of the RF chains 108. In some cases, the device 102 may have a single RF chain. As another example, the device 102 may transmit the packets 116 (e.g., sensing packets) using a second RF chain of the RF chains 108.

The comparison of each motion detection metric 156 for each of the one or more sensing sets 117 and the baseline metric 136 may include determining a mean squared errors of phase differences between the motion detection metric 156 and the baseline metric 136. The comparison of each motion detection metric 156 for each of the one or more sensing sets 117 and the baseline metric 136 may include determining a correlation of phase differences 138 between the motion detection metric 156 and the baseline metric 136.

The device 102 may classify the motion 154 as a significant motion based on the one or more detected motion magnitudes 161 exceeding a second motion threshold (of the thresholds 140). The device 102 may classify the motion 154 as a light motion based on the one or more detected motion magnitudes 161 not exceeding the second motion threshold (of the thresholds 140). For example, the second motion threshold may be greater than the first motion threshold. The first motion threshold (of the thresholds 140) is based on at least one of: a percentage of a maximum expected value for the one or more detected motion magnitudes 161, a multiple of an average value for the one or more detected motion magnitudes 161 with no motion detect, or a predetermined amplitude value.

In some cases, the device 102 may receive a plurality of sensing sets 117 of one or more sensing packets 119 on a first receiver chain of the RF chains 108, determine a plurality of motion detection metrics 156 based on phase differences between tones of the one or more sensing packets 119 for each of the sensing sets 117, determine a plurality of detected motion magnitudes 161 based on a comparison of the motion detection metric 156 for each of the sensing sets 117 and the baseline metric 136, and detect the motion 154 based on at least a portion of the plurality of detected motion magnitudes 161 exceeding a motion threshold of the thresholds 140. For example, the portion may be at least one of: at least j out of k consecutive detected motion magnitudes of the plurality of detected motion magnitudes exceeding the motion threshold, or greater than a predetermined percent of the plurality of detected motion magnitudes exceeding the motion threshold.

Thus, a device may send and receive packets in compliance with an 802.11 standard. The device may perform a phase-based comparison of (i) an MSE of phase differences of tones in the received signal with (ii) an MSE of phase differences of tones of a baseline. The baseline is determined based on a signal that is received during a period of time when motion is absent from the area that the device is monitoring. If the phase-based difference between the received signal and the baseline signal satisfies a threshold, then the device may determine that motion is present in the area. If the difference between the phase of the received signal and the phase of the baseline signal fails to satisfy the threshold, then the device may determine that motion is absent from the area (e.g., no motion is present).

A technical advantage of the system 100 includes enabling a single RF chain of a device (e.g., IOT device, edge device, or the like) to determine the presence or absence of motion in an area. Applications of this technical advantage includes physical security, monitoring children, monitoring adults, monitoring pets, gaming, and the like. By using the phase difference, the motion detection accuracy may be significantly improved compared to using an amplitude difference, providing a low cost and accurate motion sensing solution for single RF chain devices.

Figure 2A:
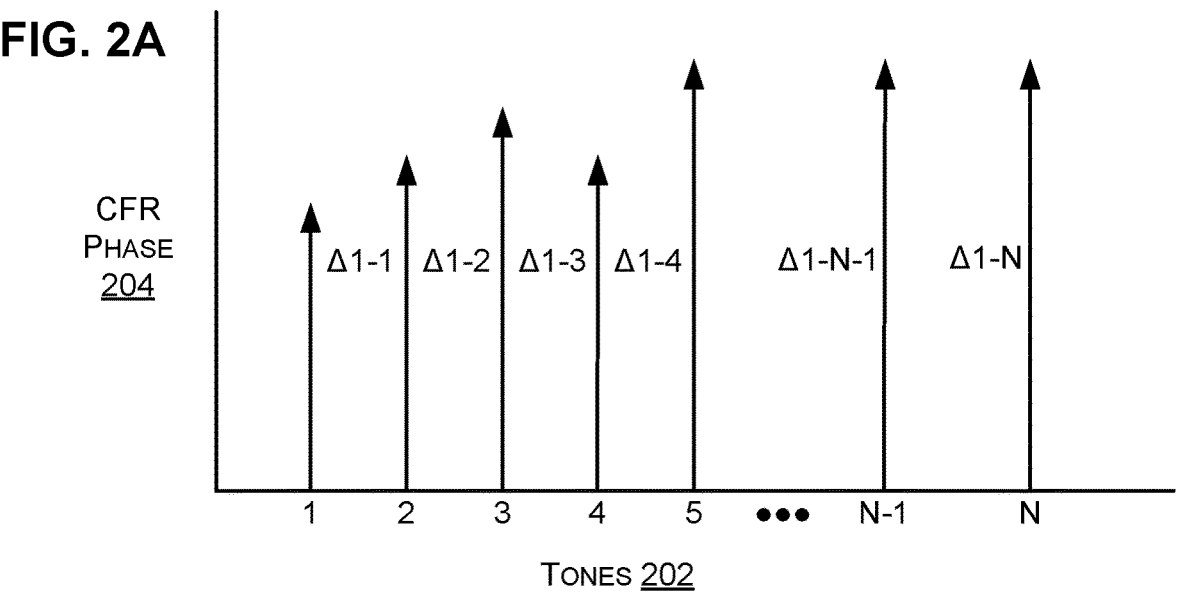
FIG. 2A illustrates a channel frequency response (CFR) phase of multiple tones, according to various aspects of the disclosure.

FIG. 2A illustrates a channel frequency response (CFR) phase of multiple tones, according to various aspects of the disclosure. In FIG. 2, a tone index 202 for N tones (N>0) is on an x-axis and a CFR phase 204 is on a y-axis. FIG. 2 illustrates determining a phase difference ($\Delta$) between adjacent tones. For example, $\Delta ij$=for packet i in a moving window, determine |phase(tone_j)–phase(tone_j+1)|, e.g., determine the absolute value of the phase difference between two tones j and tone j+1. Thus, for packet i, a phase array of phase differences between adjacent tones is determined:

phase_arr[i]=[$\Delta i1, \Delta i2, \Delta i3, \Delta i4, \ldots \Delta iN-3, \Delta iN-2, \Delta iN-1$]

While FIG. 2A illustrates determining the difference between adjacent tones, in some cases, the difference between pairs of non-adjacent tones may be determined. The pairs of tones may be selected using various techniques, such as every Mth tone (M>0), tones having an amplitude greater than a threshold, tones selected based on another selection criteria, or any combination thereof.

Figure 2B:
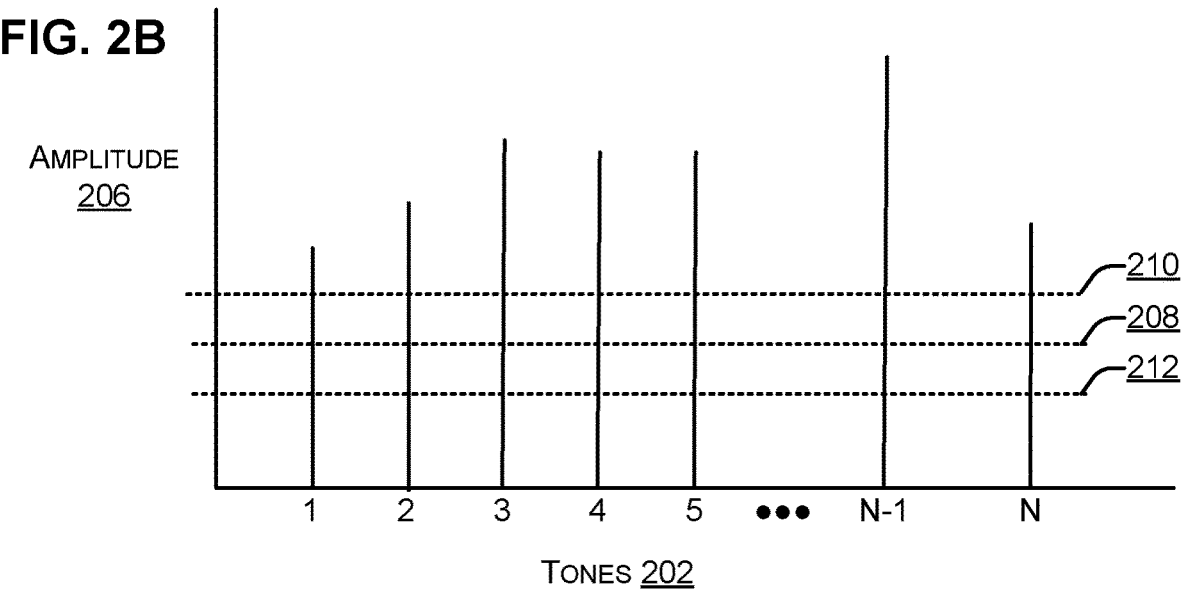
FIG. 2B illustrates an amplitude associated with multiple tones, according to various aspects of the disclosure.

FIG. 2B illustrates an amplitude associated with multiple tones, according to various aspects of the disclosure. Each of the tones 1 to N may have an associated amplitude 206. In some cases, the tones of the one or more sensing packets 119 of FIG. 1 may include at least two non-adjacent tones (e.g., tone 1 and 3). In some cases, the tones 1 to N are selected from tones with an amplitude greater than an amplitude threshold 208. For example, the amplitude threshold 208 may be based on at least one of: a percentage based on a maximum amplitude of the tones of the one or more sensing packets (e.g., in FIG. 2B, tone N−1 has the maximum amplitude), a multiple of a minimum amplitude of the tones of the one or more sensing packets (e.g., in FIG. 2B, tone 1 has the minimum amplitude), an average 210 of amplitudes of the tones of the one or more sensing packets, or a predetermined amplitude value 212.

Figure 3A:
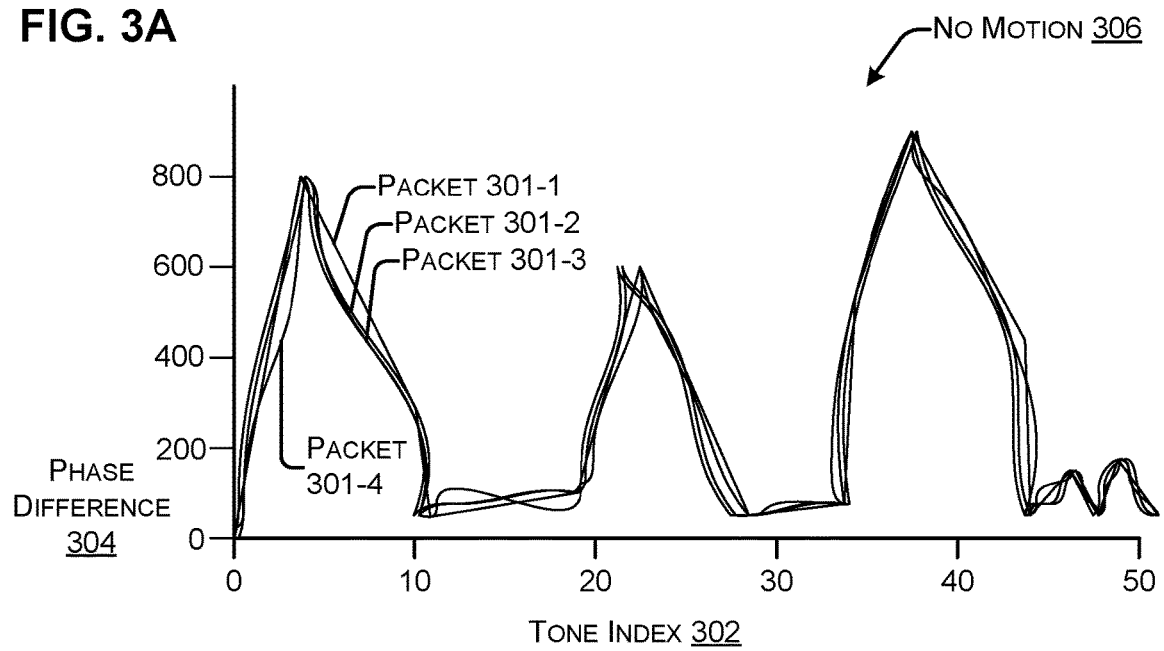
FIG. 3A illustrates phase correlation among multiple packets when motion is absent in an area, according to aspects of the disclosure.
Figure 3B:
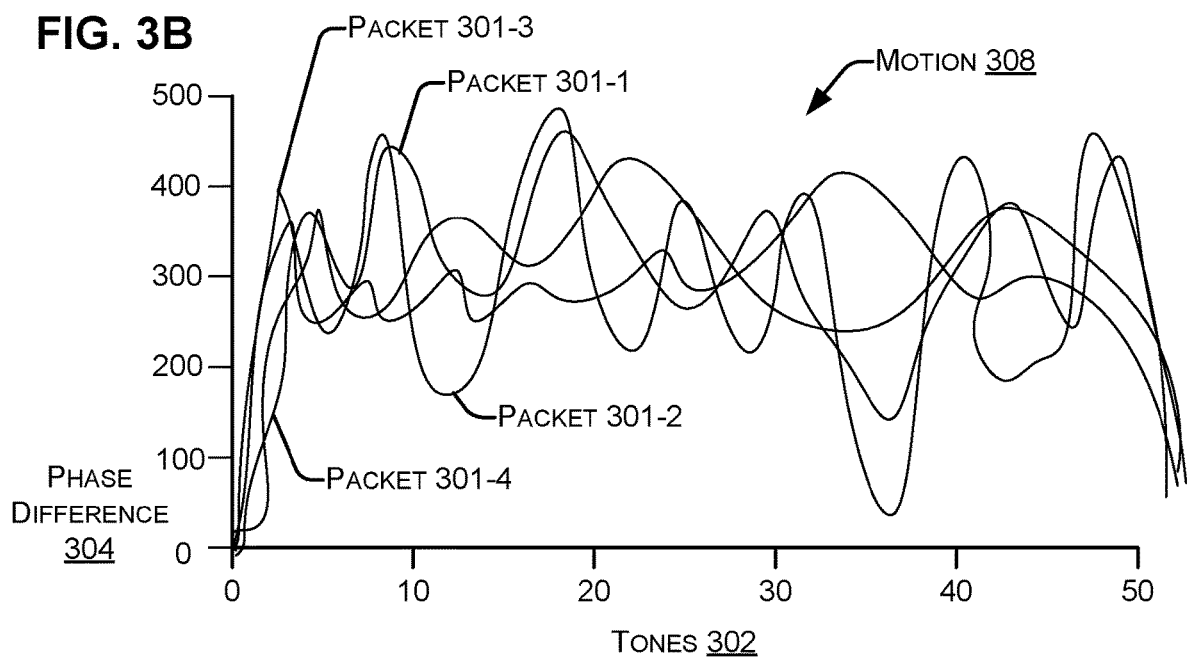
FIG. 3B illustrates a lack of phase correlation among multiple packets when motion is present in an area, according to aspects of the disclosure.

FIG. 3A illustrates phase correlation among multiple packets when motion is absent in an area, according to aspects of the disclosure. In FIG. 3A, tones 302 (e.g., carriers) are on the x-axis and phase difference 304 is on the y-axis. For example, at 20 MHz, the IEEE 802.11 standard specifies 52 tones. Of course, other frequencies may use a different number of tones. By comparing two of the tones, such as adjacent tones, the various types of interference, such as sampling frequency offset (SFO), carrier frequency offset (CFO), and timing synchronization errors (TSE), can be identified and removed, because the interference is common to each of the tones 302. FIGS. 3A and 3B illustrate the tones 302 with the interference (CFO, SFO, TSE) removed.

The different lines in FIG. 3A correspond to different packets 301-1, 301-2, 301-3, 301-4 (collectively referred to as packets 301). When no motion 306 is present, there is a strong correlation of phase across the packets 301, resulting in a low (e.g., less than or equal to a threshold) phase difference between the packets 301, as illustrated in FIG. 3A.

FIG. 3B illustrates a lack of phase correlation among multiple packets when motion is present in an area, according to aspects of the disclosure. When motion 308 is present, there is less correlation of phase across the packets 301 (e.g., as compared to when no motion is present), resulting in a high (e.g., greater than a threshold) phase difference between the packets 301, as illustrated in FIG. 3B. A mean squared error (MSE) of the phase differences 304 may be determined to enable motion to be easily detected.

Figure 4:
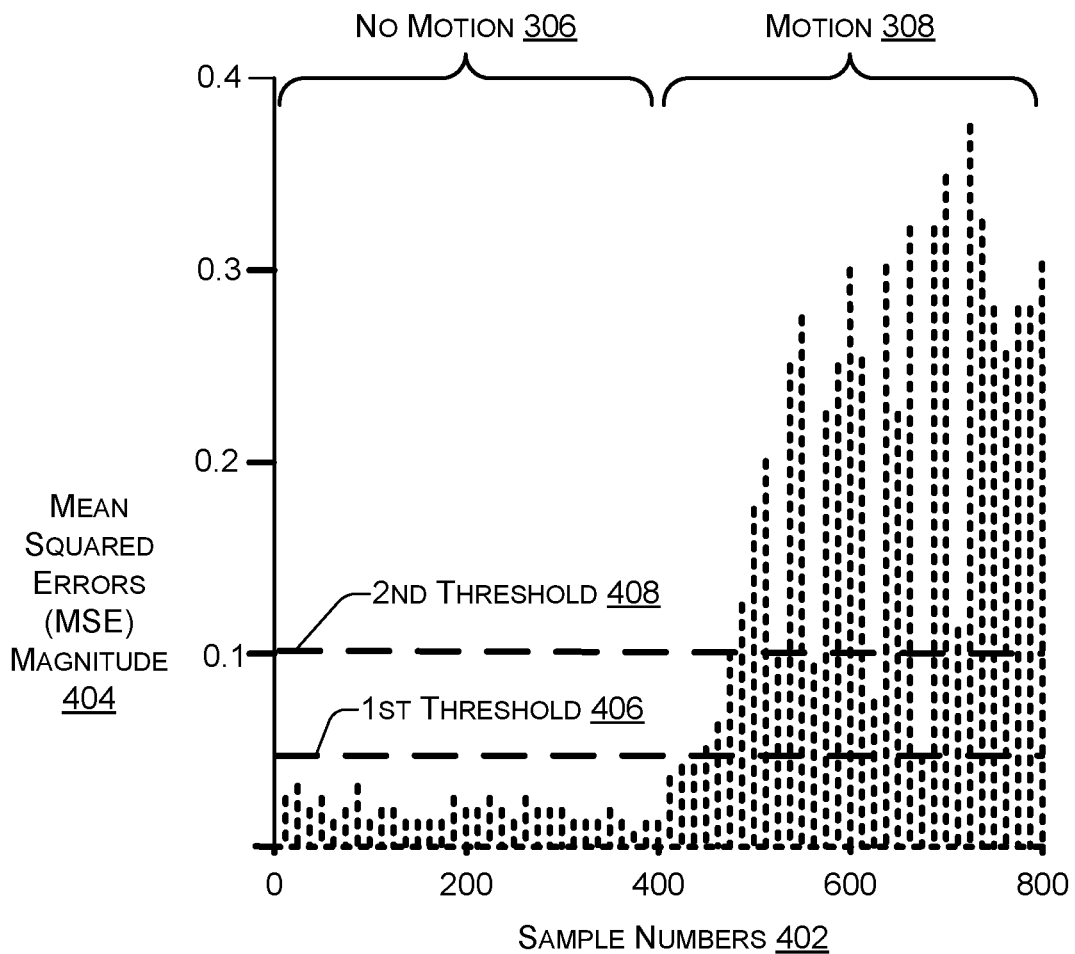
FIG. 4 illustrates an example of a number of mean squared error (MSE) exceeding a threshold when motion is present in an area, according to aspects of the disclosure.

FIG. 4 illustrates an example of a value of a mean squared error (MSE) of phase differences exceeding a threshold when motion is present in an area, according to aspects of the disclosure. FIG. 4 illustrates the MSE of phase difference between different packets as related to the presence of motion and an amount of motion. In FIG. 4, sample numbers 402 are on the x-axis and MSE are on the y-axis. When there is no motion 306 present, the MSE 404 of the phase differences does not exceed a first MSE threshold 406 (or may exceed the threshold very infrequently). When motion 308 is present, the MSE 404 of the phase differences begins to increase beyond the first threshold 406 (indicating at least a light motion). When the MSE 404 of the phase differences increases beyond a second threshold 408, then the MSE 404 indicates that a significant amount of motion is present. For illustration purposes, in FIG. 4, the first threshold 406 is about 0.5 and the second threshold 408 is about 0.1. In some aspects, the thresholds 406, 408 may have different values that are selected based on a size of the area being monitored, a desired motion detection accuracy, characteristics of the area being monitored (e.g., sparse populated or densely populated), an average amount of motion occurring in the area, or any combination thereof. Thus, FIG. 4 illustrates that the MSE 404 of the phase difference between tones (e.g., adjacent tones) of packets can be used to detect the presence of motion and the amount of motion that is present. The MSE 404 may be used to make the phase differences easier to identify. Of course, other techniques to determine a deviation besides the MSE 404 may be used. For example, accumulated error greater than a threshold, average error greater than a threshold, median error greater than a threshold, or a similar technique may be used to determine whether the phase differences indicate the presence of motion.

Further, it will be appreciated that detecting that motion 308 is present can be performed based on individual samples/packets. However, in other aspects, the samples or packets may be combined into one or more sensing sets or sets. Each sensing set has one or more sensing packets. The one or more motion detection metrics are each based on phase differences between tones of the one or more sensing packets for each of the one or more sensing sets. The one or more detected motion magnitudes (e.g., MSE 404 magnitude) is based on a comparison of each motion detection metric for each of the one or more sensing sets and a baseline metric. The motion 308 is detected based on at least a portion of the one or more detected motion magnitudes exceeding a first motion threshold. For example, as illustrated in FIG. 4, samples 0 to 399 may represent a first sensing set of motion determinations (MSE 404 magnitudes) for associated sensing packets received by a wireless device. Samples 400 to 799 may represent a second sensing set of motion determinations (MSE 404 magnitudes) for associated sensing packets received by the wireless device. A no motion 306 determination is made for the first group because none of the detected motion magnitudes (MSE 404) exceeded the first motion threshold 406. However, it will be appreciated that even if a small percentage exceeded the first threshold 406, no motion 306 may still have been indicated as the portion of the detected motion magnitudes was not sufficient to trigger a motion detection determination. However, a motion 308 determination is made for the second group because a portion of the detected motion magnitudes (MSE 404) exceeded the first motion threshold 406. It will be appreciated that even if a small percentage does not exceed the first threshold 406, as illustrated, motion 308 is still indicated as the portion of the detected motion magnitudes was sufficient to trigger the motion detection determination. It will be appreciated that the various aspects allow for the portion to be determined in any number of ways. For example, the portion may be determined as at least j out of k consecutive detected motion magnitudes of the plurality of detected motion magnitudes exceeding the motion threshold (e.g., first threshold 406), where j is an integer and k is an integer greater than j. Accordingly, if there is a concentration of detected motion magnitudes within the group, a motion 308 could be detected even if the majority of the detected motion magnitudes did not indicate motion. In other aspects, the portion may be determine as being greater than a predetermined percent of the detected motion magnitudes exceeding the motion threshold (e.g., first threshold 406). In still other aspects, the portion may be weighted based on a sum or other weighting of the detected motion magnitudes. This would allow for indications of significant motion (e.g., exceeding the second threshold 408) to have a greater impact on the motion 308 determination. Additionally, these considerations may be used to classify the motion 308 as a light motion or significant motion. For example, as illustrated in FIG. 4, a significant portion of the detected motion magnitudes (MSE 404) exceed the second threshold 408. Accordingly, the motion 308 may further be classified as significant motion. It will be appreciated that the various aspects disclosed are not limited to these examples, which are provided merely to aid in the illustration and explanation of some of the various aspects disclosed. For example, the groupings, as discussed herein, may differ, and the groupings of packets may be dynamic based on detected conditions. For example, a grouping may be dynamically determined based on a detected motion magnitude exceeding the first threshold and then including a predetermined number of samples within the group to determine whether that group would indicate motion, light motion, or significant motion, based on the portion that exceeded the various thresholds, as discussed herein.

In the flow diagrams of FIGS. 5, 6, 7, 8, 9, and 10, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the methods/processes 500, 600, 700, and 800, are described with reference to FIGS. 1, 2, 3, and 4, as described above, although other models, frameworks, systems, and environments may be used to implement the methods/processes 500, 600, 700, and 800.

Figure 5:
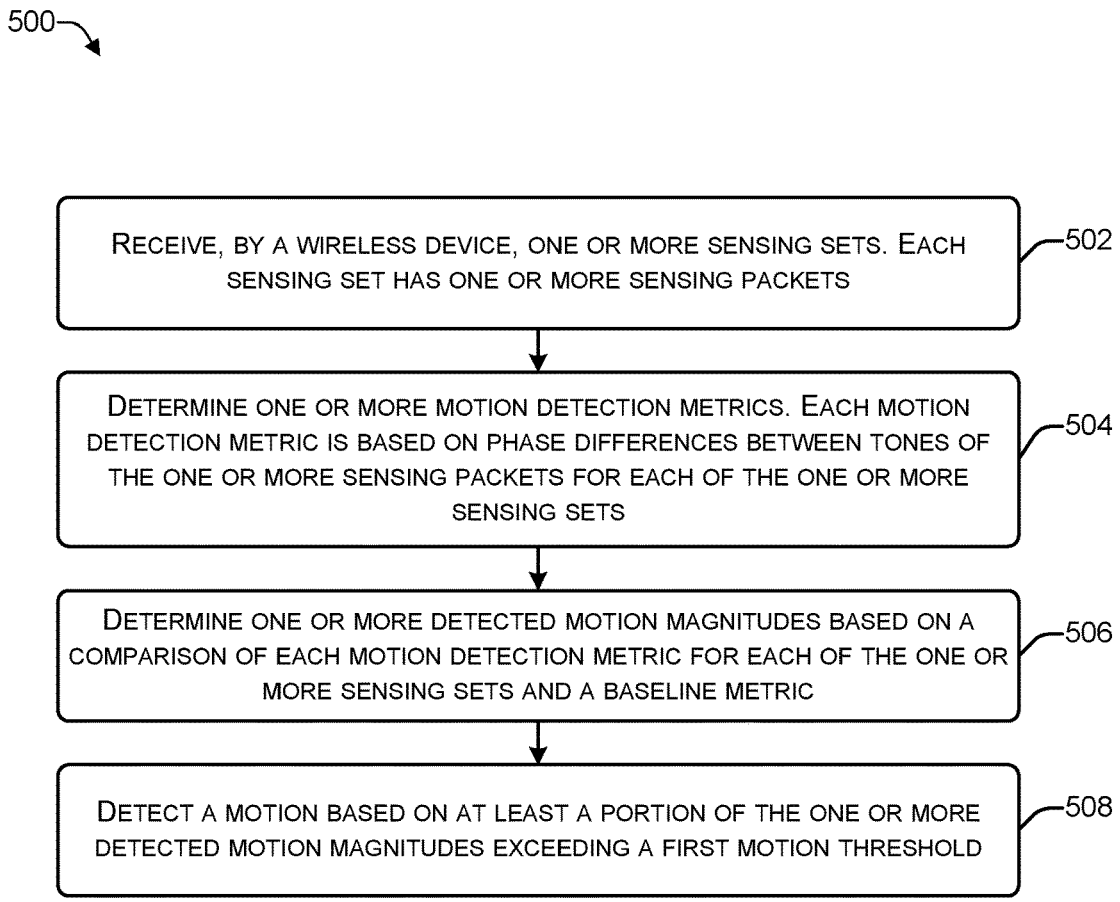
FIG. 5 illustrates an example method of detecting motion, according to aspects of the disclosure.

FIG. 5 illustrates an example method 500 of detecting motion, according to aspects of the disclosure. The method 500 may be performed by a user equipment (UE), such as the wireless device 102 of FIG. 1, to detect motion.

At 502, the wireless device receives one or more sensing sets. Each sensing set has one or more sensing packets. For example, in FIG. 1, the device 102 receives the Rx packets 118 that include the sensing sets 117, with each of the sensing sets 117 including sensing packets 119. In an aspect, 502 may be performed by one or more components of the device 102, such as, for example, the processors 153, the memory 155, and the RF chain(s) 108, any or all of which may be considered means for performing this operation.

At 504, the wireless device determines one or more motion detection metrics. Each motion detection metric is based on phase differences between tones of the one or more sensing packets for each of the one or more sensing sets. For example, in FIG. 1, the device 102 determines the one or more motion detection metrics 156. Each of the motion detection metrics 156 is based on phase differences between tones of the one or more sensing packets 119 for each of the one or more sensing sets 117, as described herein. In an aspect, 504 may be performed by one or more components of the device 102, such as, for example, the processors 153, the memory 155, and the RF chain(s) 108, any or all of which may be considered means for performing this operation.

At 506, the wireless device determines one or more detected motion magnitudes based on a comparison of each motion detection metric for each of the one or more sensing sets and a baseline metric. For example, in FIG. 1, the device 102 determines one or more detected motion magnitudes 161 based on a comparison of each of the motion detection metrics 156 for each of the one or more sensing sets 117 and the baseline metric 136. In an aspect, 506 may be performed by one or more components of the device 102, such as, for example, the processors 153, the memory 155, and the receive module 106, any or all of which may be considered means for performing this operation.

At 508, the wireless device detects motion based on at least a portion of the one or more detected motion magnitudes exceeding a first motion threshold. For example, in FIG. 1, the device 102 detects the motion 154 in the area 152 based on the detected motion amount 157 exceeding one of the thresholds 140. In an aspect, 508 may be performed by one or more components of the device 102, such as, for example, the processors 153, the memory 155, and the RF chain(s) 108, any or all of which may be considered means for performing this operation.

At least one technical advantage of the method 500 includes enabling a single RF chain of a device (e.g., IOT device, edge device, or the like) to determine the presence or absence of motion in an area. Various applications may use this and other aspects of the disclosure including physical security, monitoring children, monitoring adults, monitoring pets, gaming, and the like. By using the phase difference, the motion detection accuracy may be significantly improved compared to using an amplitude difference, providing a low cost and accurate motion sensing solution for single RF chain devices. In addition, a further technical advantage may be realized by using both phase difference and amplitude difference to further refine detection the presence or absence of motion in a monitored area. Further, the use of a single chain for motion detection enables the use of low-cost devices, such as IOT devices.

Figure 6:
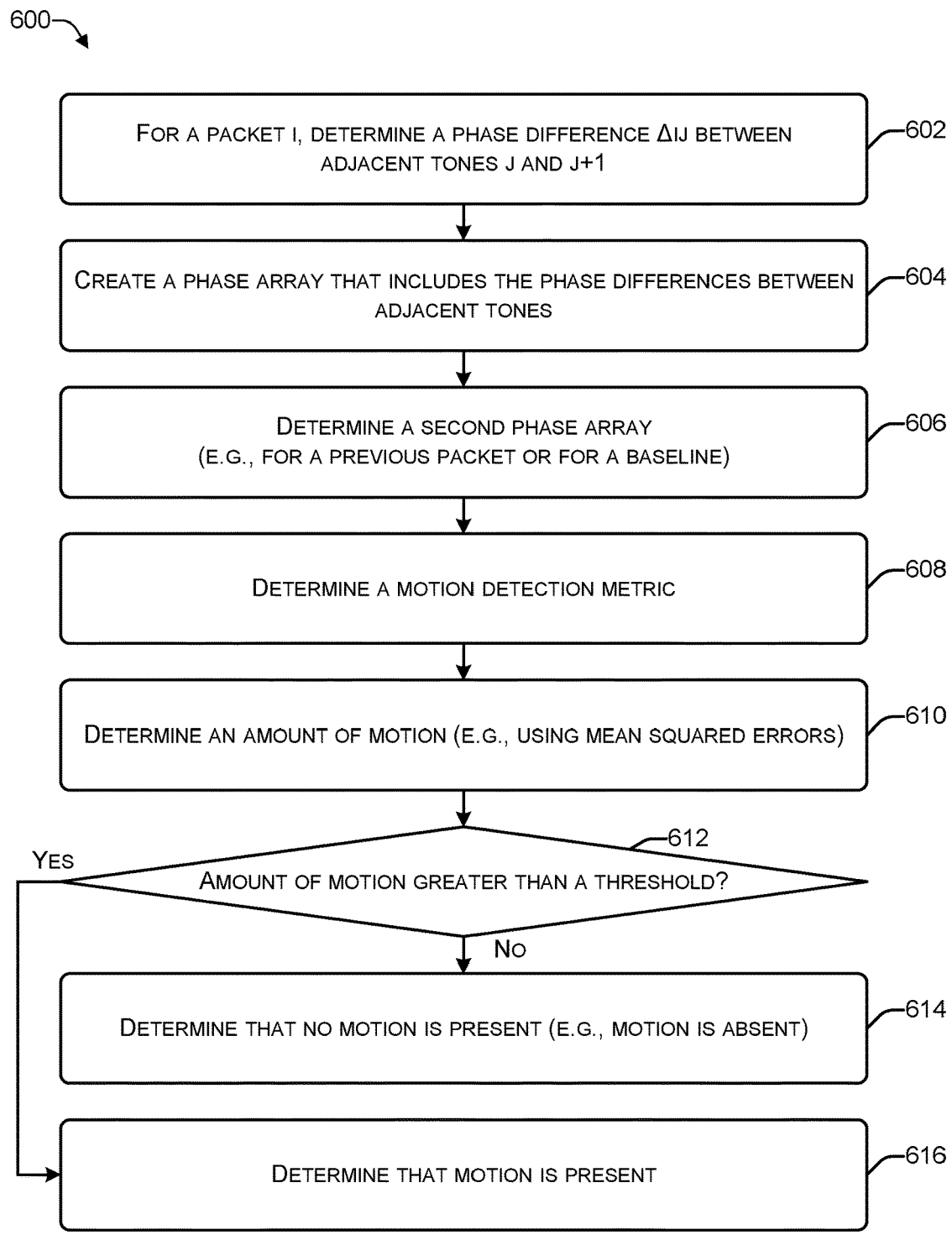
FIG. 6 illustrates a process that includes determining an amount of motion, according to aspects of the disclosure.

FIG. 6 illustrates a process 600 that includes determining one of the motion detection metrics 156, according to aspects of the disclosure. The process 600 may be performed by the phase-based comparison 132 of FIG. 1.

At 602, for a packet i, the phase difference $\Delta ij$ between adjacent tones j and j+1 is determined:

$$\Delta_{ij} = \text{phase}(\text{tone}(j)) - \text{phase}(\text{tone}(j+1))$$

Each particular frequency has an associated number of tones. For example, there are 52 (e.g., N=52) tones at 20 Mhz. In an aspect, 602 may be performed by Tx module 104, Rx module 106, memory 155, and processors 153, any or all of which may be considered means for performing this operation. Therefore, at 20 MHz, 51 phase differences are determined, thus creating, at 604, a phase array:

$$\text{phase\_array}[i] = [\Delta_i, \Delta_{j+1}, \ldots \Delta_{N-1}]$$

In an aspect, 604 may be performed by Tx module 104, Rx module 106, memory 155, and processors 153, any or all of which may be considered means for performing this operation. At 606, a second phase array ("g") is determined. The second phase array may be determined for a baseline (e.g., the baseline metric 136 of FIG. 1):

$$g = \frac{1}{M_{BL}} \sum_{i=1}^{M_{BL}} \text{phase\_arr}[i]$$

At 606, a sum ($\Sigma$) of each phase_array[i] for i=1 to $M_{BL}$ is determined, where $M_{BL}$ is the number of packets used to determine the baseline metric 136 and then dividing the sum by $M_{BL}$ to determine the array g having N−1 elements. In an aspect, 606 may be performed by Tx module 104, Rx module 106, memory 155, and processors 153, any or all of which may be considered means for performing this operation.

At 608, a motion detection array f(t) is determined by determining a sum of a phase_array[t−i] from i=1 to i=$M_{MD}$, where $M_{MD}$ is a number of packets used for motion detection. The sum is then divided by $M_{MD}$ to determine the array f(t) having N−1 elements:

$$f(t) = \frac{1}{M_{MD}} \sum_{i=1}^{M_{MD}} \text{phase\_arr}[t - i]$$

In an aspect, 608 may be performed by Tx module 104, Rx module 106, memory 155, and processors 153, any or all of which may be considered means for performing this operation. Note that when $M_{MD}=1$, the process 600 can use a single packet to determine f(t), and compare the current f(t) with a previous packet f(t−1) to compute an amount of motion, at 610, using a mean squared error (MSE):

$$MSE = \frac{1}{N-1} \sum_{j=1}^{N-1} N - 1 \left( f^j(t) - f^j(t-1) \right)^2$$

In an aspect, 610 may be performed by Tx module 104, Rx module 106, memory 155, and processors 153, any or all of which may be considered means for performing this operation. At 612, a determination is made whether the amount of motion is greater than a threshold amount. In an aspect, 612 may be performed by Tx module 104, Rx module 106, memory 155, and processors 153, any or all of which may be considered means for performing this operation. If a determination is made, at 612, that the amount of motion is less than or equal to a threshold, then the process 600 determines, at 616, that no motion is present. In an aspect, 616 may be performed by Tx module 104, Rx module 106, memory 155, and processors 153, any or all of which may be considered means for performing this operation. If a determination is made, at 612, that "yes" the amount of motion is greater than the threshold, then the process 600 determines, at 614, that motion is present. In an aspect, 614 may be performed by Tx module 104, Rx module 106, memory 155, and processors 153, any or all of which may be considered means for performing this operation.

Thus, a baseline is established when no motion is present in an area. The baseline is an array of the average phase difference between adjacent tones when motion is absent from an area. The size of the baseline array is based on the number of packets used to establish the baseline. When the area is being monitored to detect motion, a motion detection array is determined that includes the average phase difference between adjacent tones. The size of the motion detection array is based on the number of packets being used to detect motion. An MSE of the difference between the motion detection array and either the baseline array or an array associated with a previous set of packets is determined. If the MSE is relatively small (e.g., fails to satisfy a threshold), then a device monitoring the area may determine that no motion is present in the area. If the MSE is relatively large (e.g., satisfies the threshold), then the device monitoring the area may determine that motion is present in the area.

The Wi-Fi standard specifies 20 MHz, 40 MHz, 80 Mhz, 160 Mhz, and 320 MHz bandwidths. While a wider bandwidth provides greater accuracy, a wider bandwidth also consumes more power. For this reason, the examples herein use 20 Mhz. However, it should be understood that bandwidths wider than 20 Mhz may be used. Typically, transmit power is proportional to bandwidth to maintain a same signal to noise ratio (SNR). For example, 40 MHz Tx power usage is twice that of 20 MHz (3 dB higher) and 80 MHz power usage is four times that of 20 MHz (e.g., 6 dB higher).

The number of tones is a function of both bandwidth (e.g., 20, 40, 80, 160, or 320 MHz) and preamble type (802.11a, 802.11n, 802.11ac, 802.11ax, 802.11be). For example, 802.11a 20 MHz has 52 tones, 802.11n/ac 20 MHz has 56 tones, and 802.11ax has 60 tones for 1× long training field (LTF), 122 tones for 2×LTF, and 242 tones for 4 LTF. 802.11a 40/80/160 MHz is a linear scale of 20 MHz tones. 802.11n/ac 40 MHz has 114 tones and 802.11ac 80 MHz has 242 tones.

The number of packets $M_{BL}$ used to determine the baseline (e.g., the baseline metric 136 of FIG. 1), and a time interval during which the packets are sent and received, may be varied based on the desired accuracy, the amount of time, and other factors. available to determine the baseline. For example, 1200 packets that are each sent at an interval of 50 milliseconds (ms) apart enables the baseline to be determined in 1 minute. As another example, using 100 packets sent at 100 ms interval enables the baseline to be determined in 10 seconds. As yet another example, 200 packets sent at 10 ms interval enables the baseline to be determined in 2 seconds.

A technical advantage of the process 600 includes enabling a single RF chain of a device (e.g., IOT device, edge device, or the like) to determine the presence or absence of motion in an area. By using the phase difference, the motion detection accuracy may be significantly improved compared to using an amplitude difference, providing a low cost and accurate motion sensing solution for single RF chain devices.

Figure 7:
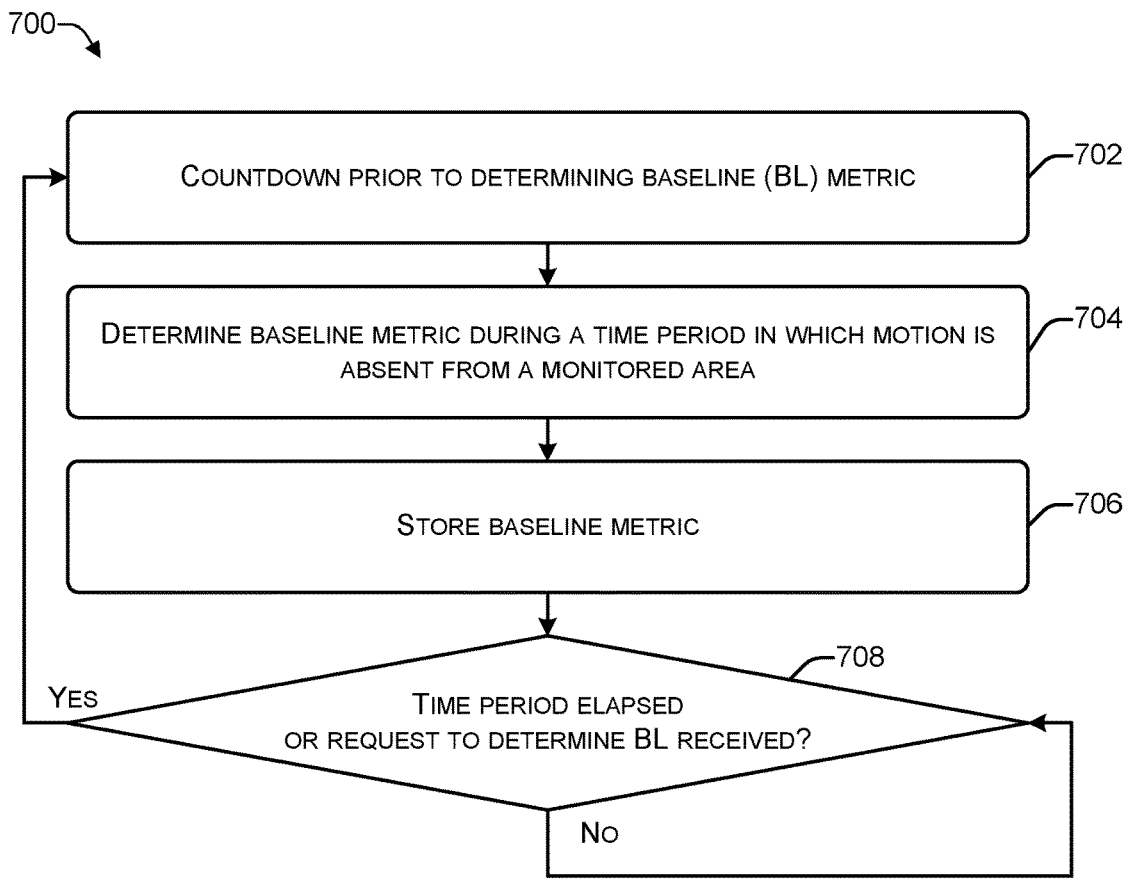
FIG. 7 illustrates an example process that includes determining a difference between a metric and a baseline, according to aspects of the disclosure.

FIG. 7 illustrates an example process 700 that includes determining a baseline, according to aspects of the disclosure. For example, the process 700 may be performed by the device 102 of FIG. 1 to determine the baseline metric 136.

At 702, the process may perform a countdown prior to determining a baseline metric. For example, in FIG. 1, prior to determining the baseline metric 136, the device 102 may provide an audible countdown (e.g., "10, 9, 8 . . . 1. Now initiating process to determine baseline"), a visual countdown, or both. The countdown may enable a user to remove objects capable of motion from the area 152. In this way, the area 152 may be clear of objects that can move during the time period that the baseline metric 136 is being determined. In an aspect, 702 may be performed by Tx module 104, Rx module 106, memory 155, and processors 153, any or all of which may be considered means for performing this operation.

At 704, the process may determine the baseline metric during a time period in which motion is absent from a monitored area. In an aspect, 704 may be performed by Tx module 104, Rx module 106, memory 155, and processors 153, any or all of which may be considered means for performing this operation. At 706, the process may store the baseline metric. For example, in FIG. 1, after counting down, the device 102 may transmit the Tx packets 116, receive the Rx packets 118 during a particular period of time. The device may use the Rx packets 118 to determine the received signal 130 and determine the baseline metric 136 based on the received signal 130. The device 102 may store the baseline metric 136 in a location (e.g., in a memory or on a storage device) that is accessible to the device 102. In an aspect, 706 may be performed by Tx module 104, Rx module 106, memory 155, and processors 153, any or all of which may be considered means for performing this operation.

At 708, a determination may be made whether a particular amount of time has elapsed or whether a request has been received to determine the baseline metric. If the process determines, at 708, that "yes" the particular amount of time has elapsed or the request has been received, then the process may proceed to 702. If the process determines, at 708. that "no" the particular amount of time has not elapsed nor has the request been received, then the process may remain at 708. For example, in FIG. 1, the device 102 may periodically, e.g., at a particular time interval such as every day at a particular time (e.g., 3:00 AM) determine the baseline metric 136. A user may use a user interface (UI) or hardware (e.g., toggle switches or the like) to program the device 102 as to when (e.g., what day and time) and how often (e.g., every N days, where N>0) the device 102 determines the baseline metric 136. In addition, the device 102 may enable the user to manually initiate the process to determine the baseline metric 136. If the device 102 determines that the user has initiated the process or that the particular time interval has elapsed, then the device 102 may perform the process 700. In an aspect, 708 may be performed by Tx module 104, Rx module 106, memory 155, and processors 153, any or all of which may be considered means for performing this operation.

Thus, a device may perform a countdown to enable a user to remove objects capable of motion from an area prior to determining a baseline metric. The baseline metric may measure phase differences between adjacent tones, amplitude differences between adjacent tones, or both in an area during a time period when motion is absent from the area. At a later point in time, the device may be set to detect motion in the area. To detect motion, the device may monitor the area by sending and receiving a particular number of packets at a particular time interval. The device may use the packets to determine an MSE of the phase differences between adjacent tones, a correlation of amplitude differences between adjacent tones, or both. If the device determines that the MSE, the correlation, or both satisfy a threshold, then the device may determine that motion is present in the area and perform one or more actions, such as sending an alert message to a user or a monitoring service, raising an audible alarm, a visual alarm, a combination of both, or another type of action. If the device determines that motion is not present in the area, the device may continue to monitor the area for the presence of motion. A technical advantage of the process 700 includes enabling a device (e.g., the device 102 of FIG. 1) to automatically calibrate the baseline metric and to enable a user to initiate the calibration process. By providing a countdown prior to determining the baseline metric, the baseline metric is determined at a time when motion is absent from a monitored area.

Figure 8:
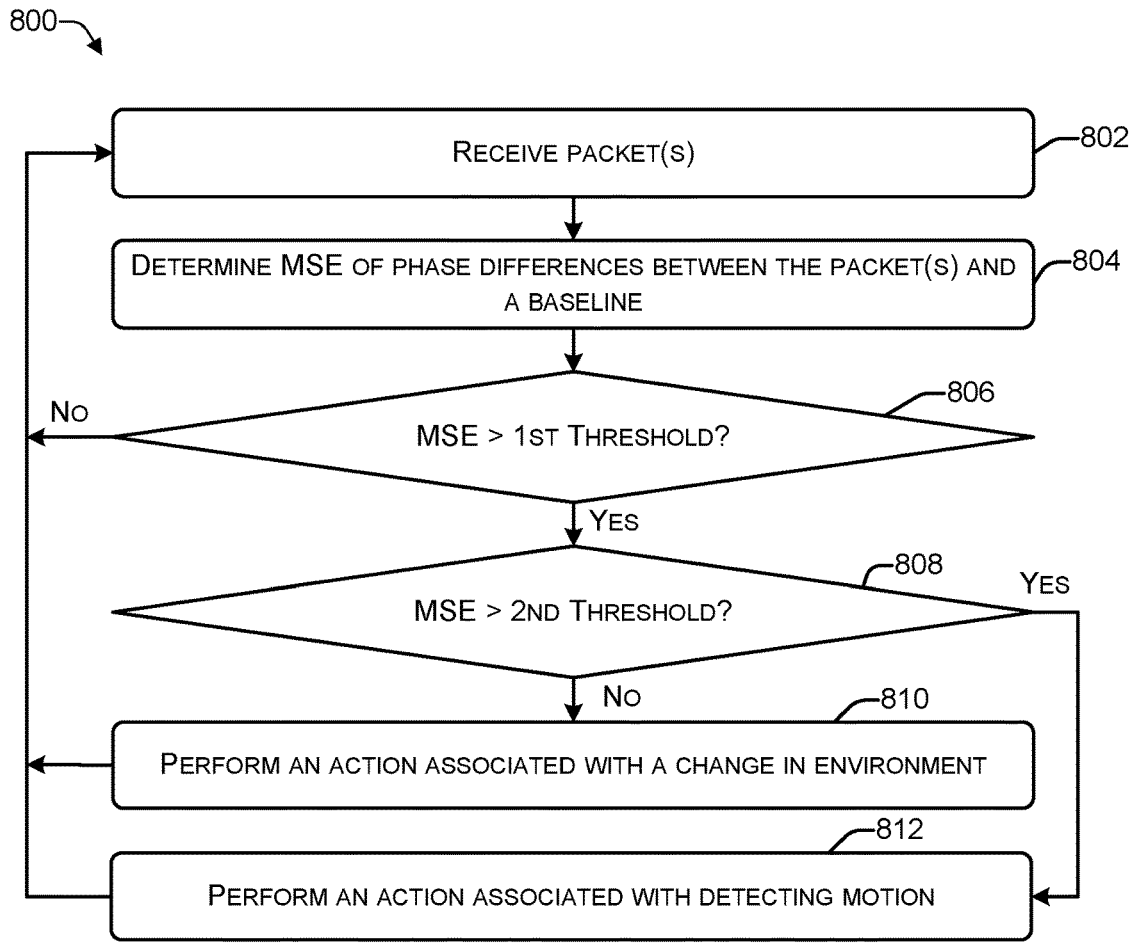
FIG. 8 illustrates an example process that includes performing an action associated with detecting motion, according to aspects of the disclosure.

FIG. 8 illustrates an example process 800 that includes performing an action associated with detecting motion, according to aspects of the disclosure. For example, the process 800 may be performed by the device 102 of FIG. 1. The process 800 detects motion in an area and more subtle changes, such as a modification to an environment. For example, the process 800 can determine that someone moved an item to a different location in an environment, added an item to the environment, removed an item from the environment, or any combination thereof. In some aspects, detecting a change in the environment may result in the process 800 performing an action, such as, for example, sending an alert to notify someone that the environment changed or determining a new baseline using the modified environment.

At 802, the device receives one or more packet(s). At 804, the device determines an MSE of the phase difference between the metric and a baseline. For example, in FIG. 1, the device 102 may receive the Rx packets 118 and use the phase-based comparison 132 to determine the MSE of the phase differences 138 between the received signal 130 and the baseline metric 136. In an aspect, 802 and 804 may be performed by Tx module 104, Rx module 106, memory 155, and processors 153, any or all of which may be considered means for performing this operation.

At 806, the device determines whether the MSE of the phase differences between the metric and the baseline is greater than a first threshold. If the device determines, at 808, that the MSE is less than or equal to the first threshold, the device proceeds to 802. For example, in FIG. 1, if the device 102 determines that the MSE of the phase differences is less than a first of the thresholds 140, then the device 102 may determine that no motion is present in the area 152 and continue to monitor the area 152 (e.g., continue to receive the Rx packets 118). In an aspect, 806 may be performed by Tx module 104, Rx module 106, memory 155, and processors 153, any or all of which may be considered means for performing this operation.

If the device determines, at 806, that the MSE of the phase differences is greater than the first threshold, then the device proceeds to 810. In an aspect, 806 may be performed by Tx module 104, Rx module 106, memory 155, and processors 153, any or all of which may be considered means for performing this operation. At 810, the device determines whether the MSE of the phase differences is greater than a second threshold. If the device determines, at 810, that the MSE of the phase differences is less than or equal to the second threshold, then the device performs an action associated with detecting a change in an environment, at 810, and proceeds back to 802. In an aspect, 810 may be performed by Tx module 104, Rx module 106, memory 155, and processors 153, any or all of which may be considered means for performing this operation. If the device determines, at 808, that the MSE of the phase differences is greater than the second threshold, then the device performs an action associated with detecting motion, at 812, and proceeds back to 802. For example, in FIG. 1, if an environment of the area 152 changes (e.g., a new piece of furniture is moved into or removed from the area 152), the MSE of the phase differences between a recently received packet and the baseline may be greater than the first threshold but less than or equal to the second threshold. In such cases, the device 102 may perform an action, such as automatically scheduling a new baseline calculation, alerting a user that the environment has changed (e.g., to enable the user to initiate a new baseline calculation or to change the environment back to an original state), or the like. If the device 102 determines, using the phase-based comparison 132, that the MSE of the phase differences 138 is greater than a second of the thresholds 140, then the device 102 may determine that the motion 154 is present in the area 152 and perform one or more actions to indicate that motion has been detected. The actions may include sending an alert message to a user, sending an alert to a monitoring service, sounding an audible alarm, performing another action to indicate that motion was detected, or any combination thereof. In an aspect, 812 may be performed by Tx module 104, Rx module 106, memory 155, and processors 153, any or all of which may be considered means for performing this operation.

Of course, in some cases a single threshold (rather than two thresholds), such as the second threshold, may be used. For example, if the difference between the MSE of the phase differences between a first packet and the baseline is greater than or equal to the second threshold, then the device may determine that motion is detected and perform one or more actions. If the difference between the metric and the baseline is less than the second threshold, then the device may determine that no motion is present in the area and continue to monitor the area.

Thus, a device may send and receive packets to monitor motion in an area. The received packets may be used to determine whether an MSE of a phase difference between adjacent tones (e.g., carriers) satisfies a first threshold. If the MSE fails to satisfy the first threshold, then the device may determine that no motion is present in the area and continue to monitor the area. If the MSE satisfies the first threshold and satisfies a second threshold, then the device may determine that motion is present and perform one or more actions. If the MSE satisfies the first threshold but fails to satisfy the second threshold then, in some cases, the device may perform further analysis to determine whether motion is present in the area. For example, in some cases, the device may send data that includes the received signal, the differences, the baseline, and other data to a server for analysis. The server may perform an analysis and send results that indicate whether or not motion was detected in the area. The device may perform one or more actions if the results indicate that motion was detected and may continue to monitor the area if the results indicate that motion was not detected. In other cases, the device may perform further analysis by performing an amplitude-based comparison in which the device determines a correlation between an amplitude of adjacent tones to supplement the results of the phase-based comparison to determine whether motion is present in the area.

A technical advantage of the process 800 includes enabling a single RF chain of a device (e.g., IOT device, edge device, or the like) to determine the presence or absence of motion in an area and to determine whether the environment has changed (e.g., furniture added, removed, or both). A technical advantage includes differentiating between motion in an area and environmental changes. When motion is detected, an action, such as sending a notification or sounding an alarm, may be performed. When environmental changes are detected, the device may automatically schedule a time to determine a new baseline measurement based on the changed environment. In this way, the device automatically re-establishes the baseline after changes to the environment.

Figure 9:
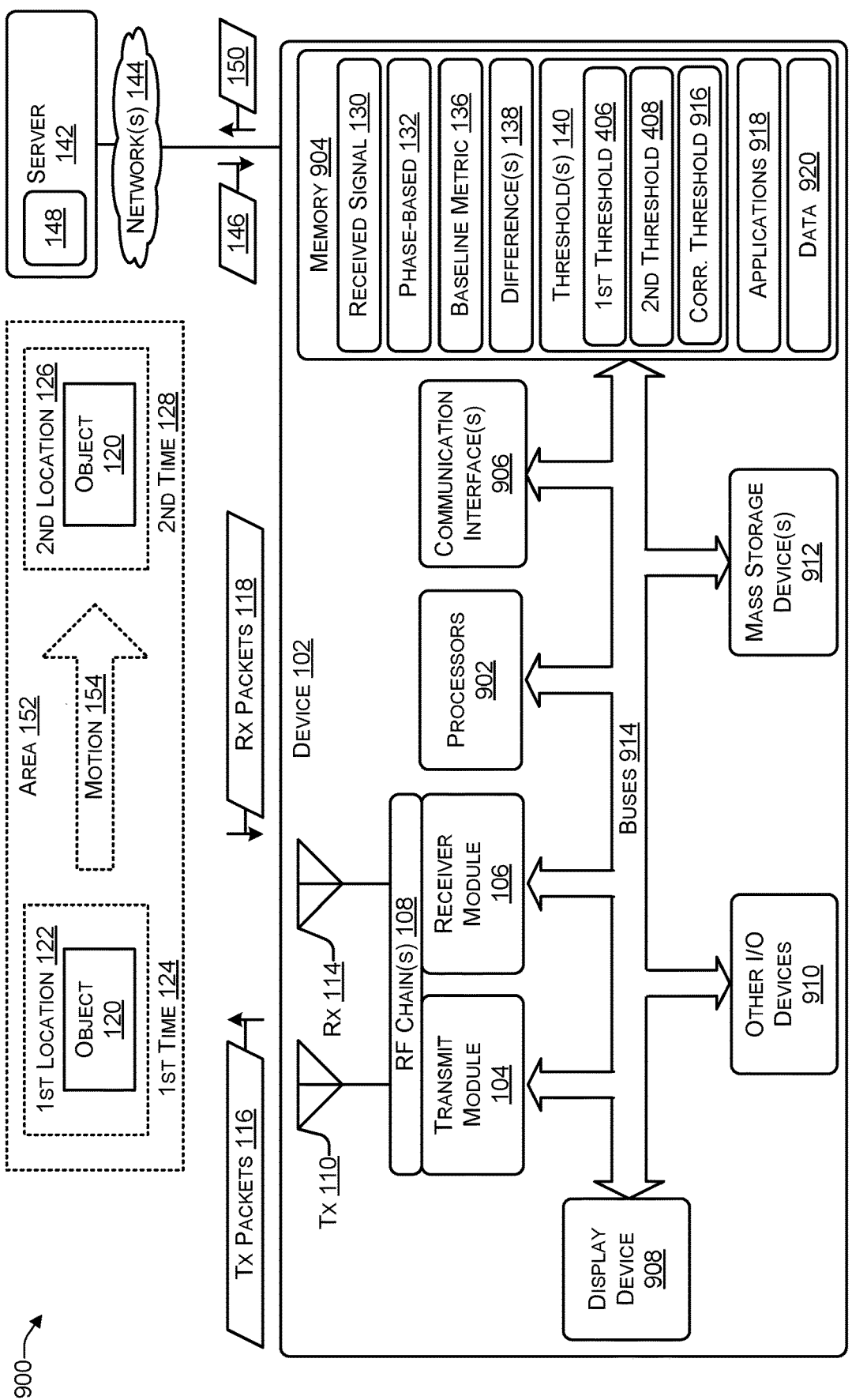
FIG. 9 illustrates a communications system to implement the processes described herein, in accordance with aspects of the disclosure.

FIG. 9 illustrates a device 900 to implement the processes of FIGS. 5-10, in accordance with an aspect of the disclosure. The device 102 may include one or more processors 902, a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While the system bus 914 is illustrated as a single bus for ease of understanding, it should be understood that the system buses 914 may include multiple buses, such as a memory device bus, a storage device bus (e.g., serial advanced technology attachment (SATA) and the like), data buses (e.g., universal serial bus (USB) and the like), video signal buses, power buses, etc.

The processors 902 are one or more hardware devices that may include a single processing unit or a number of processing units, all of which may include single or multiple computing units or multiple cores. The processors 902 may include a graphics processing unit (GPU) that is integrated into the central processing unit (CPU) or the GPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 may be configured to fetch and execute computer-readable instructions stored in the memory 904, mass storage devices 912, or other computer-readable media.

Memory 904 and mass storage devices 912 are examples of computer storage media (e.g., memory storage devices) for storing instructions that can be executed by the processors 902 to perform the various functions described herein. For example, memory 904 may include both volatile memory and non-volatile memory devices. Further, mass storage devices 912 may include hard disk drives, solid-state drives, removable media, including external and removable drives, memory cards, flash memory, floppy disks, optical disks, a storage array, a network attached storage, a storage area network, or the like. Both memory 904 and mass storage devices 912 may be collectively referred to as memory or computer storage media herein and may be any type of non-transitory media capable of storing computer-readable, processor-executable program instructions as computer program code that can be executed by the processors 902 as a particular machine configured for carrying out the operations and functions described in the implementations herein.

The device 900 may include one or more communication interfaces 906 for exchanging data. The communication interfaces 906 can facilitate communications within a wide variety of networks and protocol types, including wired networks and wireless networks, the Internet, and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 904 and mass storage devices 912, may be used to store software and data. For example, the computer storage media may be used to store the received signal 130, the phase-based comparison 132, the baseline metric 136, the differences 138, the thresholds 140, e.g., including the first threshold 406, the second threshold 408, and a correlation threshold 916, additional applications 918, and additional data 920.

Figure 10:
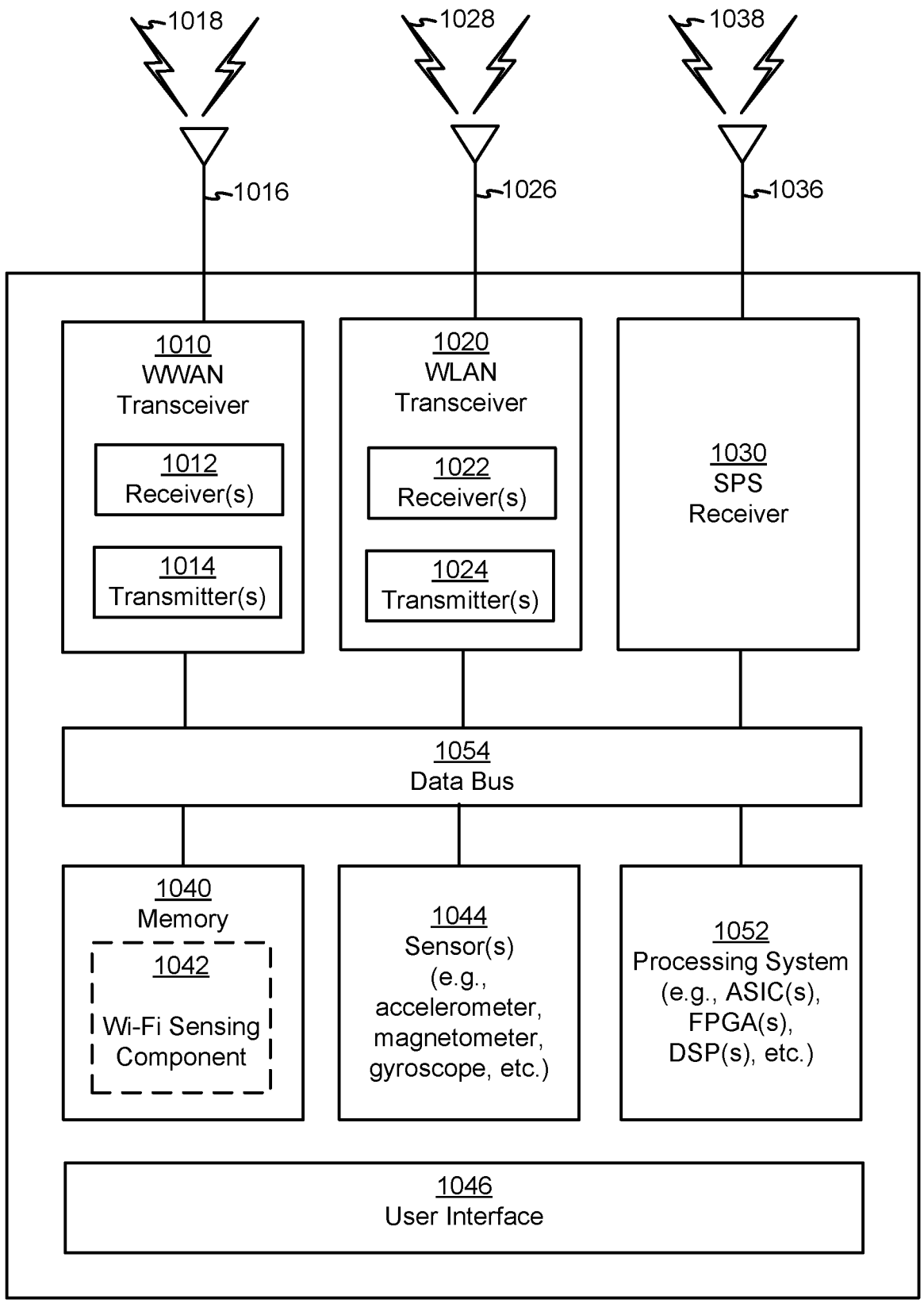
FIGS. 10 and 11 are simplified block diagrams of several sample aspects of components that may be employed in wireless communication nodes and configured to support communication as described herein.
Figure 11:
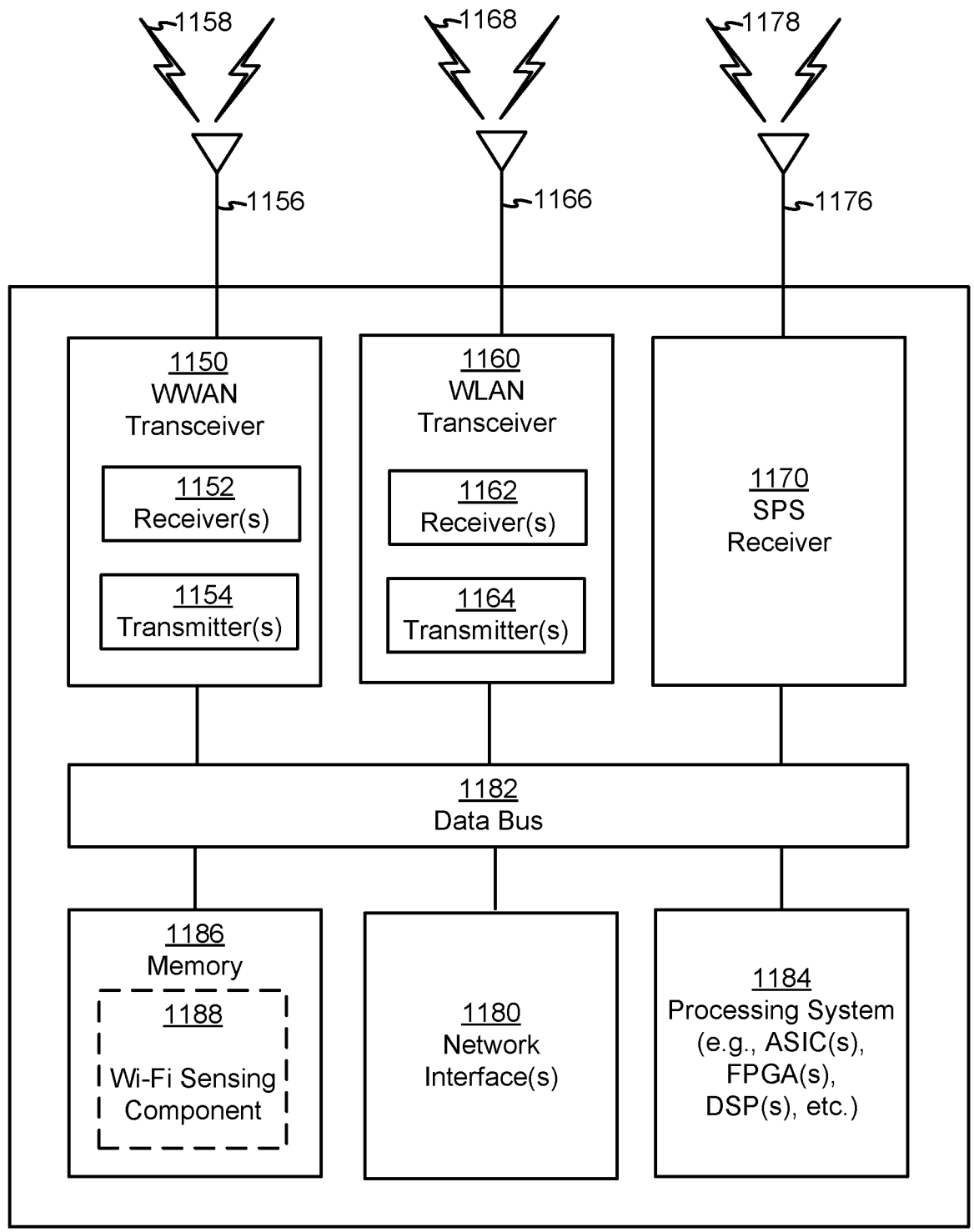

Referring to FIGS. 10 and 11, several example components (represented by corresponding blocks) that may be incorporated into a UE (e.g., the device 102 of FIG. 1), a server (e.g., the server 142 of FIG. 1) or both are described. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE and server may include wireless wide area network (WWAN) transceiver 1010 and 1150, respectively, configured to communicate via one or more wireless communication networks (not shown), such as an NR network, an LTE network, a GSM network, and/or the like. The WWAN transceivers 1010 and 1150 may be connected to one or more antennas 1016 and 1156, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 1010 and 1150 may be variously configured for transmitting and encoding signals 1018 and 1158 (e.g., messages, indications, information, and so on), respectively, and conversely, for receiving and decoding signals 1018 and 1158 (e.g., messages, indications, information, pilots, and so on), respectively, in accordance with the designated RAT. Specifically, the transceivers 1010 and 1150 include one or more transmitters 1014 and 1154, respectively, for transmitting and encoding signals 1018 and 1158, respectively, and one or more receivers 1012 and 1152, respectively, for receiving and decoding signals 1018 and 1158, respectively.

The UE and the base station also include, at least in some cases, wireless local area network (WLAN) transceivers 1020 and 1160, respectively. The WLAN transceivers 1020 and 1160 may be connected to one or more antennas 1026 and 1166, respectively, for communicating with other network nodes, such as other UEs, access points, base stations, etc., via at least one designated RAT (e.g., Wi-Fi, LTE-D, Bluetooth®, etc.) over a wireless communication medium of interest. The WLAN transceivers 1020 and 1160 may be variously configured for transmitting and encoding signals 1028 and 1168 (e.g., messages, indications, information, and so on), respectively, and conversely, for receiving and decoding signals 1028 and 1168 (e.g., messages, indications, information, pilots, and so on), respectively, in accordance with the designated RAT. Specifically, the transceivers 1020 and 1160 include one or more transmitters 1024 and 1164, respectively, for transmitting and encoding signals 1028 and 1168, respectively, and one or more receivers 1022 and 1162, respectively, for receiving and decoding signals 1028 and 1168, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 1016, 1026, 1156, 1166), such as an antenna array, that permits the respective apparatus to perform transmit "beamforming," as described herein. Similarly, a receiver may include or be coupled to a plurality of antennas (e.g., antennas 1016, 1026, 1156, 1166), such as an antenna array, that permits the respective apparatus to perform receive beamforming, as described herein. In an aspect, the transmitter and receiver may share the same plurality of antennas (e.g., antennas 1016, 1026, 1156, 1166), such that the respective apparatus can only receive or transmit at a given time, not both at the same time. A wireless communication device (e.g., one or both of the transceivers 1010 and 1020 and/or 1150 and 1160) of the UE and/or the base station may also comprise a network listen module (NLM) or the like for performing various measurements.

The UE and the base station may include, at least in some cases, satellite positioning systems (SPS) receivers 1030 and 1170. The SPS receivers 1030 and 1170 may be connected to one or more antennas 1036 and 1176, respectively, for receiving SPS signals 1038 and 1178, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 1030 and 1170 may comprise any suitable hardware and/or software for receiving and processing SPS signals 1038 and 1178, respectively. The SPS receivers 1030 and 1170 request information and operations as appropriate from the other systems and performs calculations necessary to determine positions of the UE and the base station using measurements obtained by any suitable SPS algorithm.

The base station and the network entity may each include at least one network interface 1180 for communicating with other network entities. For example, the network interfaces 1180 (e.g., one or more network access ports) may be configured to communicate with one or more network entities via a wire-based or wireless backhaul connection. In some aspects, the network interfaces 1180 may be implemented as transceivers configured to support wire-based or wireless signal communication. This communication may involve, for example, sending and receiving messages, parameters, and/or other types of information.

The UE, the base station, and the network entity may include other components that may be used in conjunction with the operations as disclosed herein. The UE may include processor circuitry implementing a processing system 1052 for providing functionality relating to, for example, RF sensing, and for providing other processing functionality. The base station may include a processing system 1084 for providing functionality relating to, for example, RF sensing as disclosed herein, and for providing other processing functionality. The network entity may include a processing system for providing functionality relating to, for example, RF sensing as disclosed herein, and for providing other processing functionality. In an aspect, the processing systems 1052, 1084 may include, for example, one or more general purpose processors, multi-core processors, ASICs, digital signal processors (DSPs), field programmable gate arrays (FPGA), or other programmable logic devices or processing circuitry.

The UE, the base station, and the network entity may include memory circuitry implementing memory components 1040, 1186 (e.g., each including a memory device), respectively, for maintaining information (e.g., information indicative of reserved resources, thresholds, parameters, and so on). In some cases, the UE, the base station, and the network entity may include RF sensing (e.g., Wi-Fi sensing) components 1042, 1188, respectively. The components 1042, 1188 may be hardware circuits that are part of or coupled to the processing systems 1052, 1184 respectively, that, when executed, cause the UE, the base station, and the network entity to perform the functionality described herein. In other aspects, the components 1042, 1188 may be external to the processing systems 1052, 1184 (e.g., part of a modem processing system, integrated with another processing system, etc.). Alternatively, the components 1042, 1188 may be memory modules (as shown in FIGS. 10, 11) stored in the memory components 1040, 1186 respectively, that, when executed by the processing systems 1052, 1184 (or a modem processing system, another processing system, etc.), cause the UE, the base station, and the network entity to perform the functionality described herein.

The UE may include one or more sensors 1044 coupled to the processing system 1052 to provide motion and/or orientation information that is independent of motion data derived from signals received by the WWAN transceiver 1010, the WLAN transceiver 1020, and/or the SPS receiver 1030. By way of example, the sensor(s) 1044 may include an accelerometer (e.g., a micro-electrical mechanical system (MEMS) device), a gyroscope, a geomagnetic sensor (e.g., a compass), an altimeter (e.g., a barometric pressure altimeter), and/or any other type of motion detection sensor. Moreover, the sensor(s) 1044 may include a plurality of different types of devices and combine their outputs in order to provide motion information. For example, the sensor(s) 1044 may use a combination of a multi-axis accelerometer and orientation sensors to provide the ability to compute positions in 2D and/or 3D coordinate systems.

In addition, the UE may include a user interface 1046 for providing indications (e.g., audible and/or visual indications) to a user and/or for receiving user input (e.g., upon user actuation of a sensing device such as a keypad, a touch screen, a microphone, and so on). Although not shown, the base station and the network entity may also include user interfaces.

Referring to the processing system 1184 in more detail, in the downlink, IP packets from the network entity may be provided to the processing system 1184. The processing system 1184 may implement functionality for an RRC layer, a packet data convergence protocol (PDCP) layer, a radio link control (RLC) layer, and a medium access control (MAC) layer. The processing system 1184 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 1154 and the receiver 1152 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 1154 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially pre-coded to produce multiple spatial streams. Channel estimates from a channel estimator may be used to determine the coding and modulation scheme, as well as for spatial processing. The channel estimate may be derived from a reference signal and/or channel condition feedback transmitted by the UE. Each spatial stream may then be provided to one or more different antennas 1156. The transmitter 1154 may modulate an RF carrier with a respective spatial stream for transmission.

At the UE, the receiver 1012 receives a signal through its respective antenna(s) 1016. The receiver 1012 recovers information modulated onto an RF carrier and provides the information to the processing system 1052. The transmitter 1014 and the receiver 1012 implement Layer-1 functionality associated with various signal processing functions. The receiver 1012 may perform spatial processing on the information to recover any spatial streams destined for the UE. If multiple spatial streams are destined for the UE, they may be combined by the receiver 1012 into a single OFDM symbol stream. The receiver 1012 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station. These soft decisions may be based on channel estimates computed by a channel estimator. The soft decisions are then decoded and de-interleaved to recover the data and control signals that were originally transmitted by the base station on the physical channel. The data and control signals are then provided to the processing system 1052, which implements Layer-3 and Layer-2 functionality.

In the uplink, the processing system 1052 provides demultiplexing between transport and logical channels, packet reassembly, deciphering, header decompression, and control signal processing to recover IP packets from the core network. The processing system 1052 is also responsible for error detection.

Similar to the functionality described in connection with the downlink transmission by the base station, the processing system 1052 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station may be used by the transmitter 1014 to select the appropriate coding and modulation schemes, and to facilitate spatial processing. The spatial streams generated by the transmitter 1014 may be provided to different antenna(s) 1016. The transmitter 1014 may modulate an RF carrier with a respective spatial stream for transmission.

The uplink transmission is processed at the base station in a manner similar to that described in connection with the receiver function at the UE. The receiver 1152 receives a signal through its respective antenna(s) 1156. The receiver 1152 recovers information modulated onto an RF carrier and provides the information to the processing system 1184.

In the uplink, the processing system 1184 provides demultiplexing between transport and logical channels, packet reassembly, deciphering, header decompression, control signal processing to recover IP packets from the UE. IP packets from the processing system 1184 may be provided to the core network. The processing system 1184 is also responsible for error detection.

For convenience, the UE, the base station, and/or the network entity are shown in FIGS. 10, 11 as including various components that may be configured according to the various examples described herein. It will be appreciated, however, that the illustrated blocks may have different functionality in different designs.

The various components of the UE, the base station, and the network entity may communicate with each other over data buses 1054, 1182 respectively. The components of FIGS. 10, 11 may be implemented in various ways. In some implementations, the components of FIGS. 10, 11 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by 1010 to 1046 may be implemented by processor and memory component(s) of the UE (e.g., by execution of appropriate code and/or by appropriate configuration of processor components). Similarly, some or all of the functionality represented by 1150 to 1188 may be implemented by processor and memory component(s) of the base station (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 1052, 1184 the transceivers 1010, 1020, 1150, and 1160, the memory components 1040, 1186 the components 1042, 1188 etc.

It can be noted that, although particular frequencies, integrated circuits (ICs), hardware, and other features are described in the aspects herein, alternative aspects may vary. That is, alternative aspects may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., WLAN APs, cellular base stations, smart speakers, IoT devices, mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause. Implementation examples are described in the following numbered clauses:

Clause 1. A method of detecting motion comprising: receiving, by a wireless device, one or more sensing sets, wherein each sensing set has one or more sensing packets; determining one or more motion detection metrics, wherein each motion detection metric is based on phase differences between tones of the one or more sensing packets for each of the one or more sensing sets; determining one or more detected motion magnitudes based on a comparison of each motion detection metric for each of the one or more sensing sets and a baseline metric; and detecting a motion based on at least a portion of the one or more detected motion magnitudes exceeding a first motion threshold.

Clause 2. The method of clause 1, wherein: the one or more sensing sets is a first sensing set comprising one or more first sensing packets, determining the one or more motion detection metrics comprises determining a first motion detection metric based on phase differences between tones of the one or more first sensing packets, determining the one or more detected motion magnitudes comprises determining a first detected motion magnitude based on a comparison of the first motion detection metric and the baseline metric, and detecting the motion is based on the first detected motion magnitude exceeding the first motion threshold.

Clause 3. The method of any of clauses 1 to 2, wherein the tones of the one or more sensing packets comprise non-adjacent tones.

Clause 4. The method of any of clauses 1 to 3, wherein the tones are selected from tones with an amplitude greater than an amplitude threshold.

Clause 5. The method of clause 4, wherein the amplitude threshold is based on a percentage based on a maximum amplitude of the tones of the one or more sensing packets, a multiple of a minimum amplitude of the tones of the one or more sensing packets, an average of amplitudes of the tones of the one or more sensing packets, or a predetermined amplitude value, or various combinations thereof.

Clause 6. The method of any of clauses 1 to 5, wherein the baseline metric is based on the phase differences between tones from one or more previously received packets received by a first receiver chain of the wireless device.

Clause 7. The method of clause 6, wherein the one or more previously received packets are received immediately prior to the one or more sensing packets.

Clause 8. The method of any of clauses 6 to 7, wherein the one or more previously received packets are packets received when no motion is present.

Clause 9. The method of clause 8, further comprising: receiving confirmation, via a user interface of the wireless device, to establish no motion is present.

Clause 10. The method of any of clauses 8 to 9, further comprising: determining no motion is detected based on at least a second portion of the one or more detected motion magnitudes not exceeding the first motion threshold.

Clause 11. The method of any of clauses 6 to 10, wherein the one or more previously received packets are received periodically; are received during a predetermined time of day or combinations thereof.

Clause 12. The method of any of clauses 1 to 11, further comprising: updating the baseline metric with phase differences between tones from the one or more sensing packets, when the motion is not detected.

Clause 13. The method of any of clauses 1 to 12, further comprising: establishing a temporary baseline metric based on phase differences between tones from the one or more sensing packets, when the motion is detected.

Clause 14. The method of clause 13, further comprising: receiving, via the at least one transceiver, one or more subsequent sensing packets on a first receiver chain of the wireless device; determining a subsequent motion detection metric based on phase differences between tones of the one or more subsequent sensing packets; determining a subsequent motion magnitude based on a comparison of the subsequent motion detection metric and the temporary baseline metric; and detecting a change in environment based on the subsequent motion magnitude not exceeding the first motion threshold.

Clause 15. The method of clause 14, further comprising: updating the baseline metric to the temporary baseline metric when the change in environment is detected.

Clause 16. The method of any of clauses 1 to 15, further comprising: sending, via the at least one transceiver, data and a timestamp associated with the data to a server.

Clause 17. The method of clause 16, wherein the data comprises channel state information (CSI), channel frequency response (CFR), channel impulse response (CIR), a signal strength indicator, an automatic gain control (AGC) setting, or any combination thereof.

Clause 18. The method of any of clauses 16 to 17, further comprising: receiving, via the at least one transceiver, from the server, additional information regarding the motion detected.

Clause 19. The method of clause 18, wherein the additional information includes confirmation of the motion being detected; identification of a source of the motion, classification of the motion, or various combinations thereof.

Clause 20. The method of any of clauses 1 to 19, further comprising: transmitting, via the at least one transceiver, the one or more sensing packets by the wireless device.

Clause 21. The method of clause 20, further comprising: transmitting, via the at least one transceiver, the one or more sensing packets using a first transmit chain of the wireless device.

Clause 22. The method of clause 21, wherein the wireless device has a single radio frequency (RF) chain.

Clause 23. The method of any of clauses 20 to 22, further comprising: transmitting, via the at least one transceiver, the one or more sensing packets using a second radio frequency (RF) chain of the wireless device.

Clause 24. The method of any of clauses 1 to 23, wherein the comparison of each motion detection metric for each of the one or more sensing sets and the baseline metric comprises: determining a mean squared errors of phase differences between the motion detection metric and the baseline metric.

Clause 25. The method of any of clauses 1 to 24, wherein the comparison of each motion detection metric for each of the one or more sensing sets and the baseline metric comprises: determining a correlation of phase differences between the motion detection metric and the baseline metric.

Clause 26. The method of any of clauses 1 to 25, further comprising: classifying the motion as a significant motion based on the one or more detected motion magnitudes exceeding a second motion threshold; or classifying the motion as a light motion based on the one or more detected motion magnitudes not exceeding the second motion threshold.

Clause 27. The method of clause 26, wherein the second motion threshold is greater than the first motion threshold.

Clause 28. The method of any of clauses 1 to 27, wherein the first motion threshold is based on a percentage of a maximum expected value for the one or more detected motion magnitudes, a multiple of an average value for the one or more detected motion magnitudes with no motion detect, a predetermined amplitude value, or various combinations thereof.

Clause 29. The method of any of clauses 1 to 28, further comprising: receiving, via the at least one transceiver, a plurality of sensing sets of one or more sensing packets on a first receiver chain of the wireless device; determining a plurality of motion detection metrics based on phase differences between tones of the one or more sensing packets for each of the sensing sets; determining a plurality of detected motion magnitudes based on a comparison of the motion detection metric for each of the sensing sets and a baseline metric; and detecting a motion based on at least a portion of the plurality of detected motion magnitudes exceeding a motion threshold.

Clause 30. The method of clause 29, wherein the portion of the plurality of detected motion magnitudes is: at least j out of k consecutive detected motion magnitudes of the plurality of detected motion magnitudes exceeding the motion threshold, wherein j is an integer and k is an integer greater than j, greater than a predetermined percent of the plurality of detected motion magnitudes exceeding the motion threshold; or various combinations thereof.

Clause 31. A wireless device, comprising: a memory; at least one transceiver; and at least one processor communicatively coupled to the memory and the at least one transceiver, the at least one processor configured to: receive, via the at least one transceiver, one or more sensing sets, wherein each sensing set has one or more sensing packets; determine one or more motion detection metrics, wherein each motion detection metric is based on phase differences between tones of the one or more sensing packets for each of the one or more sensing sets; determine one or more detected motion magnitudes based on a comparison of each motion detection metric for each of the one or more sensing sets and a baseline metric; and detect a motion based on at least a portion of the one or more detected motion magnitudes exceeding a first motion threshold.

Clause 32. The wireless device of clause 31, wherein: the one or more sensing sets is a first sensing set comprising one or more first sensing packets, determine the one or more motion detection metrics comprises determining a first motion detection metric based on phase differences between tones of the one or more first sensing packets, determine the one or more detected motion magnitudes comprises determining a first detected motion magnitude based on a comparison of the first motion detection metric and the baseline metric, and detect the motion is based on the first detected motion magnitude exceeding the first motion threshold.

Clause 33. The wireless device of any of clauses 31 to 32, wherein the tones of the one or more sensing packets comprise non-adjacent tones.

Clause 34. The wireless device of any of clauses 31 to 33, wherein the tones are selected from tones with an amplitude greater than an amplitude threshold.

Clause 35. The wireless device of clause 34, wherein the amplitude threshold is based on a percentage based on a maximum amplitude of the tones of the one or more sensing packets, a multiple of a minimum amplitude of the tones of the one or more sensing packets, an average of amplitudes of the tones of the one or more sensing packets, or a predetermined amplitude value, or various combinations thereof.

Clause 36. The wireless device of any of clauses 31 to 35, wherein the baseline metric is based on the phase differences between tones from one or more previously received packets received by a first receiver chain of the wireless device.

Clause 37. The wireless device of clause 36, wherein the one or more previously received packets are received immediately prior to the one or more sensing packets.

Clause 38. The wireless device of any of clauses 36 to 37, wherein the one or more previously received packets are packets received when no motion is present.

Clause 39. The wireless device of clause 38, wherein the at least one processor is further configured to: receive, via the at least one transceiver, confirmation, via a user interface of the wireless device, to establish no motion is present.

Clause 40. The wireless device of any of clauses 38 to 39, wherein the at least one processor is further configured to: determine no motion is detected based on at least a second portion of the one or more detected motion magnitudes not exceeding the first motion threshold.

Clause 41. The wireless device of any of clauses 36 to 40, wherein the one or more previously received packets are received periodically; are received during a predetermined time of day or combinations thereof.

Clause 42. The wireless device of any of clauses 31 to 41, wherein the at least one processor is further configured to: update the baseline metric with phase differences between tones from the one or more sensing packets, when the motion is not detected.

Clause 43. The wireless device of any of clauses 31 to 42, wherein the at least one processor is further configured to: establish a temporary baseline metric based on phase differences between tones from the one or more sensing packets, when the motion is detected.

Clause 44. The wireless device of clause 43, wherein the at least one processor is further configured to: receive, via the at least one transceiver, via the at least one transceiver, one or more subsequent sensing packets on a first receiver chain of the wireless device; determine a subsequent motion detection metric based on phase differences between tones of the one or more subsequent sensing packets; determine a subsequent motion magnitude based on a comparison of the subsequent motion detection metric and the temporary baseline metric; and detect a change in environment based on the subsequent motion magnitude not exceeding the first motion threshold.

Clause 45. The wireless device of clause 44, wherein the at least one processor is further configured to: update the baseline metric to the temporary baseline metric when the change in environment is detected.

Clause 46. The wireless device of any of clauses 31 to 45, wherein the at least one processor is further configured to: send, via the at least one transceiver, via the at least one transceiver, data and a timestamp associated with the data to a server.

Clause 47. The wireless device of clause 46, wherein the data comprises channel state information (CSI), channel frequency response (CFR), channel impulse response (CIR), a signal strength indicator, an automatic gain control (AGC) setting, or any combination thereof.

Clause 48. The wireless device of any of clauses 46 to 47, wherein the at least one processor is further configured to: receive, via the at least one transceiver, via the at least one transceiver, from the server, additional information regarding the motion detected.

Clause 49. The wireless device of clause 48, wherein the additional information includes confirmation of the motion being detected; identification of a source of the motion, classification of the motion, or various combinations thereof.

Clause 50. The wireless device of any of clauses 31 to 49, wherein the at least one processor is further configured to: transmit, via the at least one transceiver, via the at least one transceiver, the one or more sensing packets by the wireless device.

Clause 51. The wireless device of clause 50, wherein the at least one processor is further configured to: transmit, via the at least one transceiver, via the at least one transceiver, the one or more sensing packets using a first transmit chain of the wireless device.

Clause 52. The wireless device of clause 51, wherein the wireless device has a single radio frequency (RF) chain.

Clause 53. The wireless device of any of clauses 50 to 52, wherein the at least one processor is further configured to: transmit, via the at least one transceiver, via the at least one transceiver, the one or more sensing packets using a second radio frequency (RF) chain of the wireless device.

Clause 54. The wireless device of any of clauses 31 to 53, wherein the comparison of each motion detection metric for each of the one or more sensing sets and the baseline metric comprises: determine a mean squared errors of phase differences between the motion detection metric and the baseline metric.

Clause 55. The wireless device of any of clauses 31 to 54, wherein the comparison of each motion detection metric for each of the one or more sensing sets and the baseline metric comprises: determine a correlation of phase differences between the motion detection metric and the baseline metric.

Clause 56. The wireless device of any of clauses 31 to 55, wherein the at least one processor is further configured to: classify the motion as a significant motion based on the one or more detected motion magnitudes exceeding a second motion threshold; or classify the motion as a light motion based on the one or more detected motion magnitudes not exceeding the second motion threshold.

Clause 57. The wireless device of clause 56, wherein the second motion threshold is greater than the first motion threshold.

Clause 58. The wireless device of any of clauses 31 to 57, wherein the first motion threshold is based on a percentage of a maximum expected value for the one or more detected motion magnitudes, a multiple of an average value for the one or more detected motion magnitudes with no motion detect, a predetermined amplitude value, or various combinations thereof.

Clause 59. The wireless device of any of clauses 31 to 58, wherein the at least one processor is further configured to: receive, via the at least one transceiver, via the at least one transceiver, a plurality of sensing sets of one or more sensing packets on a first receiver chain of the wireless device; determine a plurality of motion detection metrics based on phase differences between tones of the one or more sensing packets for each of the sensing sets; determine a plurality of detected motion magnitudes based on a comparison of the motion detection metric for each of the sensing sets and a baseline metric; and detect a motion based on at least a portion of the plurality of detected motion magnitudes exceeding a motion threshold.

Clause 60. The wireless device of clause 59, wherein the portion of the plurality of detected motion magnitudes is: at least j out of k consecutive detected motion magnitudes of the plurality of detected motion magnitudes exceeding the motion threshold, wherein j is an integer and k is an integer greater than j, greater than a predetermined percent of the plurality of detected motion magnitudes exceeding the motion threshold; or various combinations thereof.

Clause 61. A wireless device, comprising: means for receiving one or more sensing sets, wherein each sensing set has one or more sensing packets; means for determining one or more motion detection metrics, wherein each motion detection metric is based on phase differences between tones of the one or more sensing packets for each of the one or more sensing sets; means for determining one or more detected motion magnitudes based on a comparison of each motion detection metric for each of the one or more sensing sets and a baseline metric; and means for detecting a motion based on at least a portion of the one or more detected motion magnitudes exceeding a first motion threshold.

Clause 62. The wireless device of clause 61, wherein: the one or more sensing sets is a first sensing set comprising one or more first sensing packets, means for determining the one or more motion detection metrics comprises determining a first motion detection metric based on phase differences between tones of the one or more first sensing packets, means for determining the one or more detected motion magnitudes comprises determining a first detected motion magnitude based on a comparison of the first motion detection metric and the baseline metric, and means for detecting the motion is based on the first detected motion magnitude exceeding the first motion threshold.

Clause 63. The wireless device of any of clauses 61 to 62, wherein the tones of the one or more sensing packets comprise non-adjacent tones.

Clause 64. The wireless device of any of clauses 61 to 63, wherein the tones are selected from tones with an amplitude greater than an amplitude threshold.

Clause 65. The wireless device of clause 64, wherein the amplitude threshold is based on a percentage based on a maximum amplitude of the tones of the one or more sensing packets, a multiple of a minimum amplitude of the tones of the one or more sensing packets, an average of amplitudes of the tones of the one or more sensing packets, or a predetermined amplitude value, or various combinations thereof.

Clause 66. The wireless device of any of clauses 61 to 65, wherein the baseline metric is based on the phase differences between tones from one or more previously received packets received by a first receiver chain of the wireless device.

Clause 67. The wireless device of clause 66, wherein the one or more previously received packets are received immediately prior to the one or more sensing packets.

Clause 68. The wireless device of any of clauses 66 to 67, wherein the one or more previously received packets are packets received when no motion is present.

Clause 69. The wireless device of clause 68, further comprising: means for receiving confirmation, via a user interface of the wireless device, to establish no motion is present.

Clause 70. The wireless device of any of clauses 68 to 69, further comprising: means for determining no motion is detected based on at least a second portion of the one or more detected motion magnitudes not exceeding the first motion threshold.

Clause 71. The wireless device of any of clauses 66 to 70, wherein the one or more previously received packets are received periodically; are received during a predetermined time of day or combinations thereof.

Clause 72. The wireless device of any of clauses 61 to 71, further comprising: means for updating the baseline metric with phase differences between tones from the one or more sensing packets, when the motion is not detected.

Clause 73. The wireless device of any of clauses 61 to 72, further comprising: means for establishing a temporary baseline metric based on phase differences between tones from the one or more sensing packets, when the motion is detected.

Clause 74. The wireless device of clause 73, further comprising: means for receiving, via the at least one transceiver, one or more subsequent sensing packets on a first receiver chain of the wireless device; means for determining a subsequent motion detection metric based on phase differences between tones of the one or more subsequent sensing packets; means for determining a subsequent motion magnitude based on a comparison of the subsequent motion detection metric and the temporary baseline metric; and means for detecting a change in environment based on the subsequent motion magnitude not exceeding the first motion threshold.

Clause 75. The wireless device of clause 74, further comprising: means for updating the baseline metric to the temporary baseline metric when the change in environment is detected.

Clause 76. The wireless device of any of clauses 61 to 75, further comprising: means for sending, via the at least one transceiver, data and a timestamp associated with the data to a server.

Clause 77. The wireless device of clause 76, wherein the data comprises channel state information (CSI), channel frequency response (CFR), channel impulse response (CIR), a signal strength indicator, an automatic gain control (AGC) setting, or any combination thereof.

Clause 78. The wireless device of any of clauses 76 to 77, further comprising: means for receiving, via the at least one transceiver, from the server, additional information regarding the motion detected.

Clause 79. The wireless device of clause 78, wherein the additional information includes confirmation of the motion being detected; identification of a source of the motion, classification of the motion, or various combinations thereof.

Clause 80. The wireless device of any of clauses 61 to 79, further comprising: means for transmitting, via the at least one transceiver, the one or more sensing packets by the wireless device.

Clause 81. The wireless device of clause 80, further comprising: means for transmitting, via the at least one transceiver, the one or more sensing packets using a first transmit chain of the wireless device.

Clause 82. The wireless device of clause 81, wherein the wireless device has a single radio frequency (RF) chain.

Clause 83. The wireless device of any of clauses 80 to 82, further comprising: means for transmitting, via the at least one transceiver, the one or more sensing packets using a second radio frequency (RF) chain of the wireless device.

Clause 84. The wireless device of any of clauses 61 to 83, wherein the comparison of each motion detection metric for each of the one or more sensing sets and the baseline metric comprises: means for determining a mean squared errors of phase differences between the motion detection metric and the baseline metric.

Clause 85. The wireless device of any of clauses 61 to 84, wherein the comparison of each motion detection metric for each of the one or more sensing sets and the baseline metric comprises: means for determining a correlation of phase differences between the motion detection metric and the baseline metric.

Clause 86. The wireless device of any of clauses 61 to 85, further comprising: means for classifying the motion as a significant motion based on the one or more detected motion magnitudes exceeding a second motion threshold; or means for classifying the motion as a light motion based on the one or more detected motion magnitudes not exceeding the second motion threshold.

Clause 87. The wireless device of clause 86, wherein the second motion threshold is greater than the first motion threshold.

Clause 88. The wireless device of any of clauses 61 to 87, wherein the first motion threshold is based on a percentage of a maximum expected value for the one or more detected motion magnitudes, a multiple of an average value for the one or more detected motion magnitudes with no motion detect, a predetermined amplitude value, or various combinations thereof.

Clause 89. The wireless device of any of clauses 61 to 88, further comprising: means for receiving, via the at least one transceiver, a plurality of sensing sets of one or more sensing packets on a first receiver chain of the wireless device; means for determining a plurality of motion detection metrics based on phase differences between tones of the one or more sensing packets for each of the sensing sets; means for determining a plurality of detected motion magnitudes based on a comparison of the motion detection metric for each of the sensing sets and a baseline metric; and means for detecting a motion based on at least a portion of the plurality of detected motion magnitudes exceeding a motion threshold.

Clause 90. The wireless device of clause 89, wherein the portion of the plurality of detected motion magnitudes is: at least j out of k consecutive detected motion magnitudes of the plurality of detected motion magnitudes exceeding the motion threshold, wherein j is an integer and k is an integer greater than j, greater than a predetermined percent of the plurality of detected motion magnitudes exceeding the motion threshold; or various combinations thereof.

Clause 91. A non-transitory computer-readable medium storing computer-executable instructions that, when executed by a wireless device, cause the wireless device to: receive one or more sensing sets, wherein each sensing set has one or more sensing packets; determine one or more motion detection metrics, wherein each motion detection metric is based on phase differences between tones of the one or more sensing packets for each of the one or more sensing sets; determine one or more detected motion magnitudes based on a comparison of each motion detection metric for each of the one or more sensing sets and a baseline metric; and detect a motion based on at least a portion of the one or more detected motion magnitudes exceeding a first motion threshold.

Clause 92. The non-transitory computer-readable medium of clause 91, wherein: the one or more sensing sets is a first sensing set comprising one or more first sensing packets, determine the one or more motion detection metrics comprises determining a first motion detection metric based on phase differences between tones of the one or more first sensing packets, determine the one or more detected motion magnitudes comprises determining a first detected motion magnitude based on a comparison of the first motion detection metric and the baseline metric, and detect the motion is based on the first detected motion magnitude exceeding the first motion threshold.

Clause 93. The non-transitory computer-readable medium of any of clauses 91 to 92, wherein the tones of the one or more sensing packets comprise non-adjacent tones.

Clause 94. The non-transitory computer-readable medium of any of clauses 91 to 93, wherein the tones are selected from tones with an amplitude greater than an amplitude threshold.

Clause 95. The non-transitory computer-readable medium of clause 94, wherein the amplitude threshold is based on a percentage based on a maximum amplitude of the tones of the one or more sensing packets, a multiple of a minimum amplitude of the tones of the one or more sensing packets, an average of amplitudes of the tones of the one or more sensing packets, or a predetermined amplitude value, or various combinations thereof.

Clause 96. The non-transitory computer-readable medium of any of clauses 91 to 95, wherein the baseline metric is based on the phase differences between tones from one or more previously received packets received by a first receiver chain of the wireless device.

Clause 97. The non-transitory computer-readable medium of clause 96, wherein the one or more previously received packets are received immediately prior to the one or more sensing packets.

Clause 98. The non-transitory computer-readable medium of any of clauses 96 to 97, wherein the one or more previously received packets are packets received when no motion is present.

Clause 99. The non-transitory computer-readable medium of clause 98, further comprising computer-executable instructions that, when executed by the wireless device, cause the wireless device to: receive confirmation, via a user interface of the wireless device, to establish no motion is present.

Clause 100. The non-transitory computer-readable medium of any of clauses 98 to 99, further comprising computer-executable instructions that, when executed by the wireless device, cause the wireless device to: determine no motion is detected based on at least a second portion of the one or more detected motion magnitudes not exceeding the first motion threshold.

Clause 101. The non-transitory computer-readable medium of any of clauses 96 to 100, wherein the one or more previously received packets are received periodically; are received during a predetermined time of day or combinations thereof.

Clause 102. The non-transitory computer-readable medium of any of clauses 91 to 101, further comprising computer-executable instructions that, when executed by the wireless device, cause the wireless device to: update the baseline metric with phase differences between tones from the one or more sensing packets, when the motion is not detected.

Clause 103. The non-transitory computer-readable medium of any of clauses 91 to 102, further comprising computer-executable instructions that, when executed by the wireless device, cause the wireless device to: establish a temporary baseline metric based on phase differences between tones from the one or more sensing packets, when the motion is detected.

Clause 104. The non-transitory computer-readable medium of clause 103, further comprising computer-executable instructions that, when executed by the wireless device, cause the wireless device to: receive, via the at least one transceiver, one or more subsequent sensing packets on a first receiver chain of the wireless device; determine a subsequent motion detection metric based on phase differences between tones of the one or more subsequent sensing packets; determine a subsequent motion magnitude based on a comparison of the subsequent motion detection metric and the temporary baseline metric; and detect a change in environment based on the subsequent motion magnitude not exceeding the first motion threshold.

Clause 105. The non-transitory computer-readable medium of clause 104, further comprising computer-executable instructions that, when executed by the wireless device, cause the wireless device to: update the baseline metric to the temporary baseline metric when the change in environment is detected.

Clause 106. The non-transitory computer-readable medium of any of clauses 91 to 105, further comprising computer-executable instructions that, when executed by the wireless device, cause the wireless device to: send, via the at least one transceiver, data and a timestamp associated with the data to a server.

Clause 107. The non-transitory computer-readable medium of clause 106, wherein the data comprises channel state information (CSI), channel frequency response (CFR), channel impulse response (CIR), a signal strength indicator, an automatic gain control (AGC) setting, or any combination thereof.

Clause 108. The non-transitory computer-readable medium of any of clauses 106 to 107, further comprising computer-executable instructions that, when executed by the wireless device, cause the wireless device to: receive, via the at least one transceiver, from the server, additional information regarding the motion detected.

Clause 109. The non-transitory computer-readable medium of clause 108, wherein the additional information includes confirmation of the motion being detected; identification of a source of the motion, classification of the motion, or various combinations thereof.

Clause 110. The non-transitory computer-readable medium of any of clauses 91 to 109, further comprising computer-executable instructions that, when executed by the wireless device, cause the wireless device to: transmit, via the at least one transceiver, the one or more sensing packets by the wireless device.

Clause 111. The non-transitory computer-readable medium of clause 110, further comprising computer-executable instructions that, when executed by the wireless device, cause the wireless device to: transmit, via the at least one transceiver, the one or more sensing packets using a first transmit chain of the wireless device.

Clause 112. The non-transitory computer-readable medium of clause 111, wherein the wireless device has a single radio frequency (RF) chain.

Clause 113. The non-transitory computer-readable medium of any of clauses 110 to 112, further comprising computer-executable instructions that, when executed by the wireless device, cause the wireless device to: transmit, via the at least one transceiver, the one or more sensing packets using a second radio frequency (RF) chain of the wireless device.

Clause 114. The non-transitory computer-readable medium of any of clauses 91 to 113, wherein the comparison of each motion detection metric for each of the one or more sensing sets and the baseline metric comprises: determine a mean squared errors of phase differences between the motion detection metric and the baseline metric.

Clause 115. The non-transitory computer-readable medium of any of clauses 91 to 114, wherein the comparison of each motion detection metric for each of the one or more sensing sets and the baseline metric comprises: determine a correlation of phase differences between the motion detection metric and the baseline metric.

Clause 116. The non-transitory computer-readable medium of any of clauses 91 to 115, further comprising computer-executable instructions that, when executed by the wireless device, cause the wireless device to: classify the motion as a significant motion based on the one or more detected motion magnitudes exceeding a second motion threshold; or classify the motion as a light motion based on the one or more detected motion magnitudes not exceeding the second motion threshold.

Clause 117. The non-transitory computer-readable medium of clause 116, wherein the second motion threshold is greater than the first motion threshold.

Clause 118. The non-transitory computer-readable medium of any of clauses 91 to 117, wherein the first motion threshold is based on a percentage of a maximum expected value for the one or more detected motion magnitudes, a multiple of an average value for the one or more detected motion magnitudes with no motion detect, a predetermined amplitude value, or various combinations thereof.

Clause 119. The non-transitory computer-readable medium of any of clauses 91 to 118, further comprising computer-executable instructions that, when executed by the wireless device, cause the wireless device to: receive, via the at least one transceiver, a plurality of sensing sets of one or more sensing packets on a first receiver chain of the wireless device; determine a plurality of motion detection metrics based on phase differences between tones of the one or more sensing packets for each of the sensing sets; determine a plurality of detected motion magnitudes based on a comparison of the motion detection metric for each of the sensing sets and a baseline metric; and detect a motion based on at least a portion of the plurality of detected motion magnitudes exceeding a motion threshold.

Clause 120. The non-transitory computer-readable medium of clause 119, wherein the portion of the plurality of detected motion magnitudes is: at least j out of k consecutive detected motion magnitudes of the plurality of detected motion magnitudes exceeding the motion threshold, wherein j is an integer and k is an integer greater than j, greater than a predetermined percent of the plurality of detected motion magnitudes exceeding the motion threshold; or various combinations thereof.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A wireless device, comprising:
a memory;
at least one transceiver; and
at least one processor communicatively coupled to the memory and the at least one transceiver, the at least one processor configured to:
receive, via the at least one transceiver, one or more sensing sets, wherein each sensing set has one or more sensing packets;
determine one or more motion detection metrics, wherein each motion detection metric is based on phase differences between tones of the one or more sensing packets for each of the one or more sensing sets;
determine one or more detected motion magnitudes based on a comparison of each motion detection metric for each of the one or more sensing sets and a baseline metric; and
detect a motion based on at least a portion of the one or more detected motion magnitudes exceeding a first motion threshold, wherein the baseline metric is based on the phase differences between tones from one or more previously received packets received by a first receiver chain of the wireless device, and wherein the one or more previously received packets are received immediately prior to the one or more sensing packets.

2. The wireless device of claim 1, wherein:
the one or more sensing sets is a first sensing set comprising one or more first sensing packets;
determine the one or more motion detection metrics determines a first motion detection metric based on phase differences between tones of the one or more first sensing packets;
determine the one or more detected motion magnitudes determines a first detected motion magnitude based on a comparison of the first motion detection metric and the baseline metric; and
detect the motion is based on the first detected motion magnitude exceeding the first motion threshold.

3. The wireless device of claim 1, wherein the tones of the one or more sensing packets comprise non-adjacent tones.

4. The wireless device of claim 1, wherein the tones are selected from tones with an amplitude greater than an amplitude threshold.

5. The wireless device of claim 4, wherein the amplitude threshold is based on a percentage based on a maximum amplitude of the tones of the one or more sensing packets, a multiple of a minimum amplitude of the tones of the one or more sensing packets, an average of amplitudes of the tones of the one or more sensing packets, a predetermined amplitude value, or various combinations thereof.

6. The wireless device of claim 1, wherein the one or more previously received packets are packets received when no motion is present.

7. The wireless device of claim 6, wherein the at least one processor is further configured to:
receive, via the at least one transceiver, confirmation, via a user interface of the wireless device, to establish no motion is present.

8. The wireless device of claim 6, wherein the at least one processor is further configured to:
determine no motion is detected based on at least a second portion of the one or more detected motion magnitudes not exceeding the first motion threshold.

9. The wireless device of claim 1, wherein the one or more previously received packets are received periodically; are received during a predetermined time of day; or combinations thereof.

10. The wireless device of claim 1, wherein the at least one processor is further configured to:
update the baseline metric with phase differences between tones from the one or more sensing packets, when the motion is not detected.

11. The wireless device of claim 1, wherein the at least one processor is further configured to:
establish a second baseline metric based on phase differences between tones from the one or more sensing packets, when the motion is detected.

12. The wireless device of claim 11, wherein the at least one processor is further configured to:
receive, via the at least one transceiver, one or more subsequent sensing packets on a first receiver chain of the wireless device;
determine a subsequent motion detection metric based on phase differences between tones of the one or more subsequent sensing packets;

determine a subsequent motion magnitude based on a comparison of the subsequent motion detection metric and the second baseline metric; and
detect a change in environment based on the subsequent motion magnitude not exceeding the first motion threshold.

13. The wireless device of claim 12, wherein the at least one processor is further configured to:
update the baseline metric to the second baseline metric when the change in environment is detected.

14. The wireless device of claim 1, wherein the at least one processor is further configured to:
send, via the at least one transceiver, data and a timestamp associated with the data to a server.

15. The wireless device of claim 14, wherein the data comprises channel state information (CSI), channel frequency response (CFR), channel impulse response (CIR), a signal strength indicator, an automatic gain control (AGC) setting, or any combination thereof.

16. The wireless device of claim 14, wherein the at least one processor is further configured to:
receive, via the at least one transceiver, from the server, additional information regarding the motion detected.

17. The wireless device of claim 16, wherein the additional information includes confirmation of the motion being detected; identification of a source of the motion, classification of the motion; or various combinations thereof.

18. The wireless device of claim 1, wherein the at least one processor is further configured to:
transmit, via the at least one transceiver, the one or more sensing packets by the wireless device.

19. The wireless device of claim 18, wherein the at least one processor is further configured to:
transmit, via the at least one transceiver, the one or more sensing packets using a first transmit chain of the wireless device.

20. The wireless device of claim 19, wherein the wireless device has a single radio frequency (RF) chain.

21. The wireless device of claim 18, wherein the at least one processor is further configured to:
transmit, via the at least one transceiver, the one or more sensing packets using a second radio frequency (RF) chain of the wireless device.

22. The wireless device of claim 1, wherein the comparison of each motion detection metric for each of the one or more sensing sets and the baseline metric comprises:
determine a mean squared errors of phase differences between the motion detection metric and the baseline metric.

23. The wireless device of claim 1, wherein the comparison of each motion detection metric for each of the one or more sensing sets and the baseline metric comprises:
determine a correlation of phase differences between the motion detection metric and the baseline metric.

24. The wireless device of claim 1, wherein the at least one processor is further configured to:
classify the motion as a significant motion based on the one or more detected motion magnitudes exceeding a second motion threshold; or
classify the motion as a light motion based on the one or more detected motion magnitudes not exceeding the second motion threshold.

25. The wireless device of claim 24, wherein the second motion threshold is greater than the first motion threshold.

26. The wireless device of claim 1, wherein the first motion threshold is based on a percentage of a maximum expected value for the one or more detected motion magnitudes, a multiple of an average value for the one or more detected motion magnitudes with no motion detect, a predetermined amplitude value, or various combinations thereof.

27. The wireless device of claim 1, wherein the at least one processor is further configured to:
receive, via the at least one transceiver, a plurality of sensing sets of one or more sensing packets on a first receiver chain of the wireless device;
determine a plurality of motion detection metrics based on phase differences between tones of the one or more sensing packets for each of the plurality of sensing sets;
determine a plurality of detected motion magnitudes based on a comparison of the motion detection metric for each of the plurality of sensing sets and the baseline metric; and
detect a motion based on at least a portion of the plurality of detected motion magnitudes exceeding a motion threshold.

28. The wireless device of claim 27, wherein the portion of the plurality of detected motion magnitudes is:
at least j out of k consecutive detected motion magnitudes of the plurality of detected motion magnitudes exceeding the motion threshold, wherein j is an integer and k is an integer greater than j,
greater than a predetermined percent of the plurality of detected motion magnitudes exceeding the motion threshold; or
various combinations thereof.

29. A method of detecting motion comprising:
receiving, by a wireless device, one or more sensing sets, wherein each sensing set has one or more sensing packets;
determining one or more motion detection metrics, wherein each motion detection metric is based on phase differences between tones of the one or more sensing packets for each of the one or more sensing sets;
determining one or more detected motion magnitudes based on a comparison of each motion detection metric for each of the one or more sensing sets and a baseline metric; and
detecting a motion based on at least a portion of the one or more detected motion magnitudes exceeding a first motion threshold, wherein the baseline metric is based on the phase differences between tones from one or more previously received packets received by a first receiver chain of the wireless device, and wherein the one or more previously received packets are received immediately prior to the one or more sensing packets.

30. The method of claim 29, wherein:
the one or more sensing sets is a first sensing set comprising one or more first sensing packets,
determining the one or more motion detection metrics comprises determining a first motion detection metric based on phase differences between tones of the one or more first sensing packets,
determining the one or more detected motion magnitudes comprises determining a first detected motion magnitude based on a comparison of the first motion detection metric and the baseline metric, and
detecting the motion is based on the first detected motion magnitude exceeding the first motion threshold.

31. The method of claim 29, wherein the tones of the one or more sensing packets comprise non-adjacent tones.

32. The method of claim 29, wherein the tones are selected from tones with an amplitude greater than an amplitude threshold.

33. The method of claim 32, wherein the amplitude threshold is based on a percentage based on a maximum amplitude of the tones of the one or more sensing packets, a multiple of a minimum amplitude of the tones of the one or more sensing packets, an average of amplitudes of the tones of the one or more sensing packets, or a predetermined amplitude value, or various combinations thereof.

34. The method of claim 29, wherein the one or more previously received packets are packets received when no motion is present.

35. The method of claim 34, further comprising:
receiving confirmation, via a user interface of the wireless device, to establish no motion is present.

36. The method of claim 29, further comprising:
periodically triggering an acquisition of the one or more previously received packets.

37. A wireless device, comprising:
means for receiving one or more sensing sets, wherein each sensing set has one or more sensing packets;
means for determining one or more motion detection metrics, wherein each motion detection metric is based on phase differences between tones of the one or more sensing packets for each of the one or more sensing sets;
means for determining one or more detected motion magnitudes based on a comparison of each motion detection metric for each of the one or more sensing sets and a baseline metric; and
means for detecting a motion based on at least a portion of the one or more detected motion magnitudes exceeding a first motion threshold, wherein the baseline metric is based on the phase differences between tones from one or more previously received packets received by a first receiver chain of the wireless device, and wherein the one or more previously received packets are received immediately prior to the one or more sensing packets.

38. The wireless device of claim 37, wherein:
the one or more sensing sets is a first sensing set comprising one or more first sensing packets,
means for determining the one or more motion detection metrics comprises determining a first motion detection metric based on phase differences between tones of the one or more first sensing packets,
means for determining the one or more detected motion magnitudes comprises determining a first detected motion magnitude based on a comparison of the first motion detection metric and the baseline metric, and
means for detecting the motion is based on the first detected motion magnitude exceeding the first motion threshold.

39. A wireless device, comprising:
a memory;
at least one transceiver; and
at least one processor communicatively coupled to the memory and the at least one transceiver, the at least one processor configured to:
receive, via the at least one transceiver, one or more sensing sets, wherein each sensing set has one or more sensing packets;
determine one or more motion detection metrics, wherein each motion detection metric is based on phase differences between tones of the one or more sensing packets for each of the one or more sensing sets;
determine one or more detected motion magnitudes based on a comparison of each motion detection metric for each of the one or more sensing sets and a baseline metric; and
detect a motion based on at least a portion of the one or more detected motion magnitudes exceeding a first motion threshold, wherein the processor is further configured to:
send, via the at least one transceiver, data and a timestamp associated with the data to a server;
receive, via the at least one transceiver, from the server, additional information regarding the motion detected, wherein the additional information includes confirmation of the motion being detected, identification of a source of the motion, classification of the motion; or various combinations thereof.

40. A wireless device, comprising:
a memory;
at least one transceiver; and
at least one processor communicatively coupled to the memory and the at least one transceiver, the at least one processor configured to:
receive, via the at least one transceiver, one or more sensing sets, wherein each sensing set has one or more sensing packets;
determine one or more motion detection metrics, wherein each motion detection metric is based on phase differences between tones of the one or more sensing packets for each of the one or more sensing sets;
determine one or more detected motion magnitudes based on a comparison of each motion detection metric for each of the one or more sensing sets and a baseline metric; and detect a motion based on at least a portion of the one or more detected motion magnitudes exceeding a first motion threshold, wherein the each motion detection metric is based on phase difference between adjacent tones of the one or more sensing packets.

41. The wireless device of claim 40, wherein the wireless device has a single radio frequency (RF) chain.

* * * * *